US012202183B1

(12) United States Patent
Usui et al.

(10) Patent No.: US 12,202,183 B1
(45) Date of Patent: Jan. 21, 2025

(54) APPARATUS AND METHOD FOR INSTANTANEOUS GENERATION OF A PIN PLACEMENT QUOTE IN AN INJECTION MOLDING PROCESS

(71) Applicant: Proto Labs, Inc., Maple Plain, MN (US)

(72) Inventors: Shuji Usui, Minneapolis, MN (US); Jack Allan Rulander, Elk River, MN (US)

(73) Assignee: Proto Labs, Inc., Maple Plain, MN (US)

( * ) Notice: Subject to any disclaimer, the term of this patent is extended or adjusted under 35 U.S.C. 154(b) by 0 days.

(21) Appl. No.: 18/615,880

(22) Filed: Mar. 25, 2024

(51) Int. Cl.
*B29C 45/40* (2006.01)
*B29C 45/46* (2006.01)
*B29C 45/76* (2006.01)
*G06F 30/27* (2020.01)
*G06Q 30/04* (2012.01)
*G06F 113/22* (2020.01)
*G06F 119/18* (2020.01)

(52) U.S. Cl.
CPC .......... *B29C 45/7693* (2013.01); *G06F 30/27* (2020.01); *B29C 45/401* (2013.01); *G06F 2113/22* (2020.01); *G06F 2119/18* (2020.01); *G06Q 30/04* (2013.01)

(58) Field of Classification Search
None
See application file for complete search history.

(56) References Cited

U.S. PATENT DOCUMENTS

| 7,590,466 | B2 | 9/2009 | Lukis et al. | |
| 8,239,284 | B2 | 8/2012 | Lukis et al. | |
| 10,274,933 | B2 * | 4/2019 | Coffman | G06N 20/00 |
| 11,055,755 | B2 * | 7/2021 | Herrman | G06Q 30/0283 |

FOREIGN PATENT DOCUMENTS

JP 09160945 A 6/1997

OTHER PUBLICATIONS

K.-S. Chin et al., "An Expert System for Injection Mold Cost Estimation," Advances in Polymer Technology, vol. 14, No. 4, 1995, pp. 303-314. (Year: 1995).*

(Continued)

*Primary Examiner* — Leigh M Garbowski
(74) *Attorney, Agent, or Firm* — Caldwell Intellectual Property Law

(57) ABSTRACT

An apparatus for instantaneous generation of a pin placement quote in an injection molding process, the apparatus comprising at least a processor and a memory containing instructions configuring the at least a processor to receive part data related to at least a part from an entity, generate a pin placement schema as a function of the part data, provide a pin placement quote based on the pin placement schema, wherein providing the pin placement quote includes generating a projected part data by overlaying the pin placement schema onto the part data, determining a list of quote parameters, and formulating the pin placement quote by associating the list of quote parameters with the projected part data, and display the pin placement quote to the entity using a user interface at a display device.

18 Claims, 8 Drawing Sheets

(56) References Cited

OTHER PUBLICATIONS

R. Raviwongse et al., "Artificial Neural Network Based Model for Computation of Injection Mould Complexity," Int'l Journal of Advanced Manufacturing Technology, 1997, pp. 577-586. (Year: 1997).*
S. Kwak et al., "Layout and sizing of ejector pins for injection mould design using the wavelet transform," Proc. Instn Mech. Engrs, vol. 217 Part B: Journal Engineering Manufacture, 2003, pp. 463-473. (Year: 2003).*
D. Mun et al., "Engineered-to-order Approach for Providing Flexibility in e-Commerce of Mold Parts," Concurrent Engineering: Research and Applications, vol. 15, No. 4, Dec. 2007, pp. 347-355. (Year: 2007).*
J.M. Mercado-Colmenero et al., "A new procedure for the automated design of ejection systems in injection molds," Robotics and Computer-Integrated Manufacturing, vol. 46, 2017, pp. 68-85. (Year: 2017).*
R. Jungnickel et al., "Human-Centric Machine Learning Approach for Injection Mold Design: Towards Automated Ejector Pin Placement," Springer Nature Switzerland AC 2023, G. Nicosia et al. (Eds.) pp. 27-31. (Year: 2023).*
Chan et al.; Computerised price quoting system for injection mould manufacture; Journal of Materials Processing Technology vol. 139, Issues 1-3, Aug. 20, 2003, pp. 212-218.
Wei Liu et al; A network quotation framework for customised parts through rough requests; International Journal of Computer Integrated Manufacturing vol. 31, 2018—Issue 12, pp. 1220-1234 | Accepted Sep. 23, 2018, Published online: Oct. 5, 2018.
Cyrus Hillsman; A semi-automatic mold cost estimation framework based upon geometry similarity; The International Journal of Advanced Manufacturing Technology vol. 68, pp. 1387-1399 (2013) Published: Apr. 25, 2013.

\* cited by examiner

APPARATUS AND METHOD FOR INSTANTANEOUS GENERATION OF A PIN PLACEMENT QUOTE IN AN INJECTION MOLDING PROCESS

FIELD OF THE INVENTION

The present invention generally relates to the field of manufacturing. In particular, the present invention is directed to apparatus and method for instantaneous generation of a pin placement quote in injection molding process.

BACKGROUND

Injection molding is a versatile and widely used method for manufacturing parts by injecting molten material into a mold. In some cases, injection molding may involve using a plurality of pins. Pins in injection molding help to eject the molded part after it has cooled and solidified. Quoting for such processes is time consuming, and sometimes prone to human error and inconsistencies, especially for more complex parts with intricate geometries. The interplay of factors such as complexity of the part, quick quotation turnaround, the anticipated challenges of pin placement, material costs, labor, machine utilization, delivery time, among others makes the quoting process less than transparent and often leads to discrepancies between the initial quote and the final cost. A solution for a real-time computation and presentation of pin placement cost estimation is needed.

SUMMARY OF THE DISCLOSURE

In an aspect, an apparatus for instantaneous generation of a pin placement quote in an injection molding process is described. The apparatus includes at least a processor and a memory communicatively connected to the at least a processor, wherein the memory contains instructions configuring the at least a processor to receive part data related to at least a part from an entity, generate a pin placement schema as a function of the part data, and provide a pin placement quote based on the pin placement schema, wherein providing the pin placement quote includes generating a projected part data by overlaying the pin placement schema onto the part data, determining a list of quote parameters, and formulating the pin placement quote by associating the list of quote parameters with the projected part data. At least a processor is further configured to display the pin placement quote to the entity using a user interface at a display device.

In another aspect, a method for instantaneous generation of a pin placement quote in an injection molding process is illustrated. The method includes receiving, by at least a processor, part data related to at least a part from an entity, generating, by the at least a processor, a pin placement schema as a function of the part data, and providing, by the at least a processor, a pin placement quote based on the pin placement schema, wherein providing the pin placement quote includes generating a projected part data by overlaying the pin placement schema onto the part data, determining a list of quote parameters, and formulating the pin placement quote by associating the list of quote parameters with the projected part data. The method further includes displaying, by the at least a processor, the pin placement quote to the entity using a user interface at a display device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for instantaneous generation of a pin placement quote in an injection molding process. In an embodiment, apparatus receives part data, derives a pin placement schema from the received part data, and subsequently generates a pin placement quote for a corresponding injection molding process.

Aspects of the present disclosure can be used to significantly reduce human intervention in the quoting process of injection molding of a part, ensuring higher consistency and precision. Aspects of the present disclosure can also be used to provide customers with immediate and transparent cost estimations for their projects. Exemplary embodiments illustrating aspects of the present disclosure are described below in the context of several specific examples.

Figure 1:
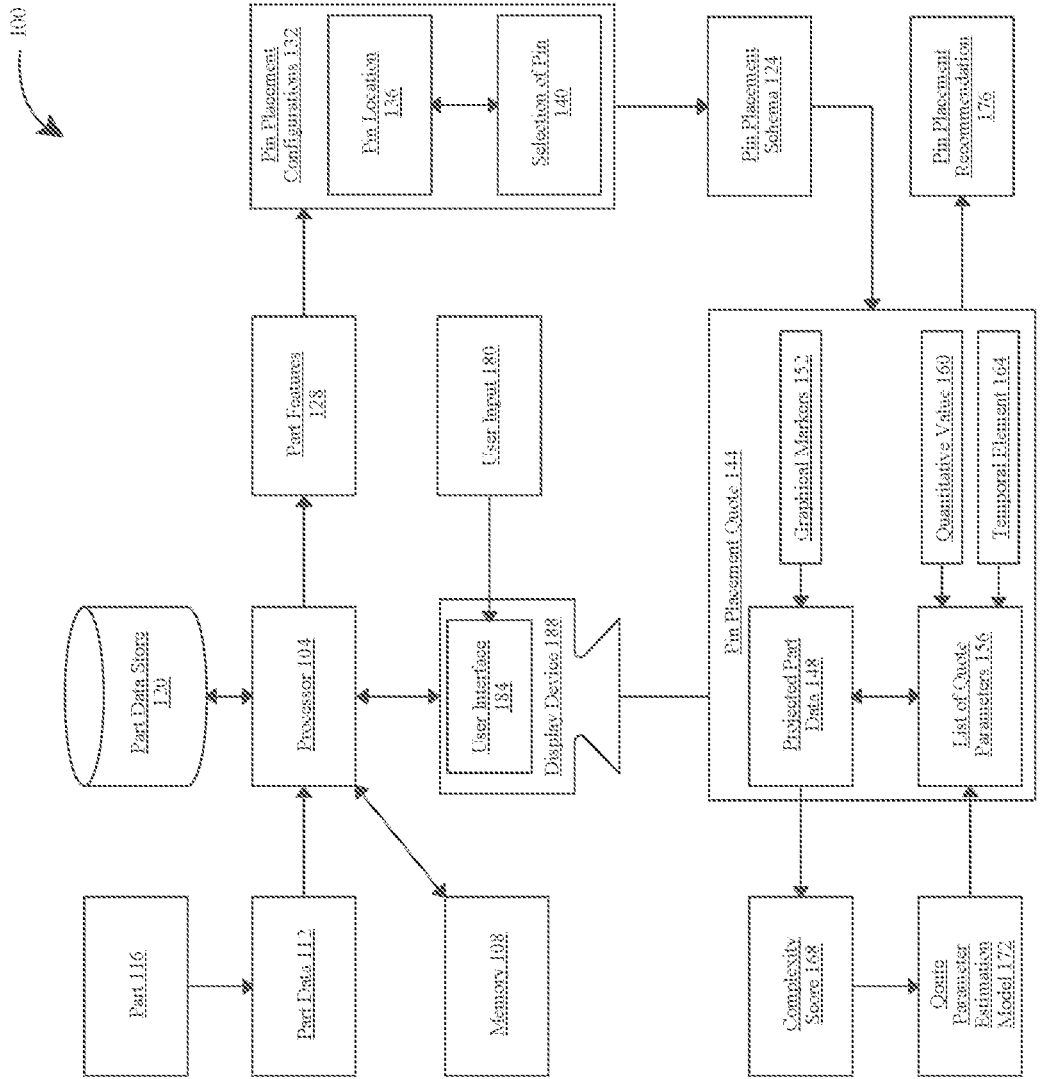
FIG. 1 is an exemplary embodiment of an apparatus for instantaneous generation of a pin placement quote in an injection molding process.

Now referring to FIG. 1, an exemplary embodiment of an apparatus 100 for instantaneous generation of a pin placement quote in an injection molding process is illustrated. As used in this disclosure, "injection molding" is a manufacturing process that involves melting material (e.g., plastic) and injecting it into one or more mold cavities to produce parts. Injection molding may be used to produce parts in large volumes. In a non-limiting example, once inside a mold, the material cools and solidifies to the shape of the cavity, thereby forming the desired part. After the material has solidified, the mold opens, and the part is ejected.

With continued reference to FIG. 1, as described herein, a "mold" refers to a tool used in the injection molding process to shape the injected material as it cools and solidifies. In some embodiments, the mold may include a plurality of components that come together to form the desired shape of the part. In some cases, during injection molding, plurality of components may be actuated by a cam action mechanism, for example, mold may include a stationary half and a moving half, which come together during the molding process. In some cases, stationary half may include one or more mold cavities (i.e., hollow spaces that define the shape of a part being molded). Moving half may include one or more cores, which is "mold core." During injection molding, molten material may be injected into cavities through a "sprue", which is a channel through which the molten material is introduced into the mold. In some cases, one or more mold cavities may include sprue. On the other hand, moving half may include one or more cores (i.e., protruding features that create recesses or holes in the molded part). In some cases, the number of cores on moving half may match with the number of mold cavities on stationary half to ensure proper alignment and accurate part formation.

With continued reference to FIG. 1, in a non-limiting example, stationary half may securely close against moving half during injection molding process, ensuring that there are no gaps or spaces where the molten material can escape. After the injection and cooling phases, the first or moving half may be opened, allowing for the finished part to be removed. In some cases, plurality of pins may be used to facilitate the part removal, since molded part may adhere or stick to the mold. This retention may be attributed to, in some cases, a grabbing effect resulting from the shrinking of material as it cools and solidifies within mold cavities or a material interaction between the plastic off the part and metal of the mold. In some cases, as molten material contracts, it may create a vacuum or suction effect, causing molded part to cling tightly to mold surface, especially if there are intricate details or not enough draft angle in the design of the part. Additionally, or alternatively, one or more factors such as, without limitation, type of material used, material cooling rate, surface finish, and/or the like of the mold may exacerbate the sticking phenomenon as described herein. To counteract this, plurality of pins e.g., plurality of ejector pins may be employed to apply a uniform force to molded part for a smooth part ejection from the mold. As used in this disclosure, an "ejector pin," is a cylindrical component that is used to push the molded part out of the mold after the part has cooled and solidified. In some cases, plurality of ejector pins may be controlled by an ejector system in an injection molding apparatus. In some cases, a plurality of pins may be actuated and/or activated during an ejection phase of the molding cycle.

With continued reference to FIG. 1, as described herein, "pin placement" refers to strategic positioning of (ejector) pins within the mold. In some cases, proper pin placement may ensure that the molded parts have or remain the desired features in the correct locations and dimensions during the ejection phase of the part. In some cases, proper placement of ejector pins may ensure that the molded part can be smoothly and efficiently ejected from the mold without sticking or getting damaged. In a non-limiting example, if one or more ejector pins are not correctly placed, misplaced ejector pins may apply an uneven force on the part during ejection, potentially leading to warping or deformation of the part. Additionally, or alternatively, while ejector pins may leave small marks on the molded parts, strategic placement of pins may ensure these marks are in non-critical or less visible areas of the part. In other cases, proper placement and usage of ejector pins may also reduce wear and tear on the produced mold, thereby extending its operational life.

With continued reference to FIG. 1, apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory 108 communicatively connected to processor 104, wherein the memory contains instructions configuring processor 104 to perform any processing steps as described in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a processor 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 may perform determinations, classification, and/or analysis steps, methods, processes, or the like for the purposes of this disclosure using machine-learning processes. A "machine-learning process," as used in this disclosure, is a process that automatedly uses a body of data known as "training data" and/or a "training set" (described further below in this disclosure) to generate an algorithm that will be performed by processor 104 to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, processor 104 is configured to receive part data 112, the part data 112 related to at least a part 116. "Part data" as used herein is defined as an element or elements of information related to part 116. "Data" as used herein, may mean plural elements of information or a single element of information. In some cases, part data may be received from an entity. An "entity," as used herein, means anyone or anything that might provide information, including a user (person), group of users, company, corporation, business, juristic entity, computer program, database, AI, algorithm, mathematical model, and the like. In some cases, part data 112 may specify parameters defining part 116 including, without limitation, design specifications, dimensions, material requirements, tolerances, and any other critical details necessary to accurately manufacture and/or delivery part 116.

With continued reference to FIG. 1, a "part," for the purpose of this disclosure, refers to a distinct piece or component of a larger system, assembly, or otherwise a structure. In some embodiments, part 116 may denote any individual element that contributes to the whole. In a non-limiting example, under the context of manufacturing and engineering, part 116 may include a single piece used in the assembly of a product or machinery. In some cases, part 116 may be manufactured from various materials, including, for example and without limitation, aluminum, steel, titanium, metal alloys, brass, and the like; plastics, such as nylon, acrylic, ABS, Delrin, polycarbonate, and the like; foam, composites, wood, etc. or other substances. In some cases, part 116 may have one or more specific functions or role within the assembled item. In some cases, part 116 may be manufactured using injection molding as described herein.

With continued reference to FIG. 1, in one or more embodiments, part data 112 may include at least a part model of at least a part 116. A "part model," as used in this disclosure, is a description, illustration, two-dimensional model, three-dimensional model, computer-aided design (CAD) model, CAD drawing, computer-aided machining (CAM) model, engineering drawing, sketch, group of dimensions, surface mesh, coordinates, or anything that shows or otherwise defines a part. In some cases, part 116 may be created by any manufacturing process other than injection molding, for example, without limitation, additive manufacturing or subtractive manufacturing. In some cases, part data 112 may include a print. In an exemplary embodiment, part data 112 may include at least one three-dimensional (3D) computer-aided design (CAD) model of at least a part 116, a two-dimensional (2D) engineering drawing of the part, a bill of materials, a material specification for the part, and other information relating to part 116.

With continued reference to FIG. 1, as used in this disclosure, "two-dimensional" means having, appearing to have, or displaying two out of the three dimensions of length, width, and height. As used in this disclosure, "three-dimensional" means having, appearing to have, or displaying all three out of the three dimensions of length, width, and height. As used herein, a "print" is defined as any 2D depiction of part 116. Such 2D prints may include any data describing the part 116 such as dimensions and tolerances. In a non-limiting example, for a given part such as an automotive brake disk, wherein part data 112 of the automotive brake disk may include a list (or any other suitable data structure for storing a collection of data e.g., vector array, dictionary, hash tables/maps, and/or the like) of key value pairs such as, "Material: Cast Iron," "Diameter 280 mm," "Thickness: 25 mm," "Number of Bolt Holes: 5," "Bolt Circle Diameter: 114.3," "Tolerance: +5 mm," "Weight: 6.2 kg," and the like.

With continued reference to FIG. 1, in some embodiments, part data 112 may include a set of part images, representing different 2D views of a 3D CAD model of part 116. In some cases, each part image may include a print as described above. In some cases, part images may be generated by projecting 3D CAD model onto a 2D plane from different orientations, capturing the intricate details and contours of part 116 from multiple perspectives. In a nonlimiting example, part data 112 may include a plurality of part images of part 116, wherein the plurality of part images include at least one part image illustrating a front view (i.e., a straight-on view) of part 116 (from the front), at least one part image illustrating a side view (i.e., view from both right and left side) of part 116, at least one part image illustrating a top view (i.e., bird's-eye view), and at least one part image illustrating a bottom view (i.e., worm's-eye view). In some cases, plurality of part images may also include one or more isometric views, wherein the isometric views may be taken from angles that show part 116 in a 3D perspective such as, without limitation, top-right, top-left, bottom-right, and bottom-left angles. In some cases, plurality of part images may further include one or more sectional views such as sectional or cut-away views of part 116.

With continued reference to FIG. 1, additionally, or alternatively, part data 112 may include information derived from one or more-part images. In some cases, part data 112 may include data describing an overall layout, footprint, dept, profile, features, fine details, and/or the like of part 116. In these cases, part data 112 may be received from one or more CAD software tools that automatically generate part images as described herein. Once generated, part images may be annotated with dimensions, labels, and other pertinent part data 112. In some cases, part data 112 may be correlated with plurality of part images, forming a visual dataset. In other cases, Part data 112 may be derived by analyzing plurality of part images using one or more image processing or computer vision techniques, including one or more machine learning processes as described in detail below. As a person skilled in the art, upon reviewing the entirety of this disclosure, will be aware of various part data 112 may be received by apparatus 100 as described herein.

With continued reference to FIG. 1, in some cases, part data 112 may be received from a part data store 120 e.g., a database. In some cases, part data store 120 may be implemented, without limitation, as a relational database, a key-value retrieval database such as a NOSQL database, or any other format or structure for use as a database that a person skilled in the art would recognize as suitable upon review of the entirety of this disclosure. Part data store 120 may alternatively or additionally be implemented using a distributed data storage protocol and/or data structure, such as a distributed hash table or the like. Part data store 120 may include a plurality of data entries and/or records as described above. Data entries in part data store 120 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a part data store 120 may store, retrieve, organize, and/or reflect data and/or records as used herein, as well as categories and/or populations of data consistently with this disclosure.

With continued reference to FIG. 1, processor 104 is configured to generate a pin placement schema 124 as a function of the part data 112. As used in this disclosure, a "pin placement schema" is a systematic representation or blueprint detailing the pin placement within a mold or tooling setup. In a non-limiting example, pin placement schema 124 and methods for generating pin placement schema may be consistent with any pin placement schema and methods outlined in U.S. patent application Ser. No. 18/615,614, filed on Mar. 25, 2024, and entitled "APPARATUS AND METHOD FOR AUTOMATIC PIN PLACEMENT IN INJECTION MOLDING", which its entirety is incorporated herein by reference.

With continued reference to FIG. 1, in some cases, generating pin placement schema 124 may include identifying a plurality of part features 128 as a function of part data 112 and generating pin placement schema 124 by matching each part feature of the plurality of part features 128 with at least one pre-defined pin placement configuration 132. In some cases, pin placement schema 124 may be generated by combining one or more pin placement configurations 132. As used in this disclosure, "part features" are attributes, characteristics, or elements that define and describe part 116. In some cases, plurality of part features 128 may include one or more geometrical features that relate to the shape, size, and spatial orientation of part. In a non-limiting example, such part features may include slots, holes, ribs, chamfers, fillets, bosses, grooves, corners, and the like. In some cases, plurality of part features 128 may include one or more material-based features, for example, features pertaining to material properties of part 116, such as, without limitation, material hardness, tensile strength, thermal conductivity, and the like. In other cases, plurality of part features 128 may include one or more surface features such as, without limitation, features related to surface finish, texture, or treatment of part 116; for instance, and without limitation, such part features may include part surface polishing, knurling, coating, and/or the like.

With continued reference to FIG. 1, as used in this disclosure, a "pre-defined pin placement configuration" is a predetermined set of guidelines, criteria, or attributes regarding the placement, orientation, and specification of plurality of pins in injection molding process. In some cases, pin placement configurations 132 may affect structural integrity, functionality, and/or manufacturability of part 116. In some cases, at least one pre-defined pin placement configuration 132 may be derived from historical data, for example, best practices in previous injection molding processes logged or saved in the system. In some cases, at least one pre-defined pin placement configuration 132 may include at least one pin location 136 and one or more selections of pin 140 corresponding to the at least one pin location 136. In some cases, pin location 136 may include a specific point or area on part 116 wherein the pin is placed. In some cases, pin location may include a coordinate e.g., (x, y) on a part surface in a XY plane. In other cases, pin location may include a (spatial) coordinate such as (x, y, z) at a specific location of 3D CAD model in a 3D space. Plurality of pins may be located at stress points on part 116 to provide support. In other instances, pins may be spaced evenly across a surface for uniform distribution of force. In some cases, selection of pin 140 may include pin type and/or corresponding thickness/width of the pin. In a non-limiting example, selection of pin 140 may include a specification of a pin diameter. In some cases, a larger diameter pin may be used in areas requiring greater support, while a smaller diameter pin may be used in areas with space constraints or less structural demand.

With continued reference to FIG. 1, in some embodiments, plurality of part features 128 may be identified based on one or more scans of at least one CAD model. As used in this disclosure, "scanning" means processor's 104 capability to interpret and analyze data contained within at least one CAD model. In some cases, at least one CAD model may be stored in a CAD file in specific file format such as, without limitation, .dwg, .dxf, .step, or .iges. In some cases, processor 104 may be configured to extract plurality of part features 128 during scanning. Processor 104 may be configured to analyze geometric and topological data embedded within the at least one CAD model (i.e., part data). In a non-limiting example, processor 104 may import CAD model and extract geometric and topological data related to part 116 by decoding the file's binary or ASCII data. In some cases, one or more specialized algorithms to interpret parametric and/or non-parametric data representations within the model may be implemented by processor 104 for feature extraction. In a non-limiting example, upon scanning, processor 104 may identify distinct geometrical entities such as vertices, edges, faces, and solids through algorithms such as, boundary representation (B-Rep), constructive solid geometry (CSG), non-uniform rational B-Splines (NURBS). Delaunay triangulation & Voronoi Diagrams, marching cubes algorithm, quadtrec 2D and Octree 3D decomposition, and/or the like. In some cases, identified geometrical entities may be then categorized based on their geometric characteristics, for example, planar or curved surfaces, linear or non-linear edges, simple or complex vertices, among others. In some cases, processor 104 may also be configured to retrieve attributes associated with CAD model such as, without limitation, material properties, tolerances, surface finishes, among others. In some cases, this may be implemented using one or more machine learning models, such as one or more classifiers as described in detail below with reference to FIG. 3. Processor 104 may organize identified set of part features 128 and/or extract information into a structure format, for example, and without limitation, a feature tree or a hierarchical data representation.

With continued reference to FIG. 1, in some embodiments, identifying plurality of part features 128 may also include recognizing patterns, symmetries, and repetitions within at least one 3D CAD model. In some cases, processor 104 may be configured to perform a feature recognition algorithm to identify and classify plurality of part features such as, without limitation, one or more geometric features such as holes, pockets, bosses, filets, and/or the like as listed above. Additionally, plurality of part features may include primitive features such as cylinders, spheres, prisms, and/or the like. In a non-limiting example, processor 104 may utilized one or more graph-based methods to identify set of part features 128 by representing part 116 as a graph, wherein the graph may include a plurality of nodes representing faces and edges represent adjacency relationships between faces. In some cases, recognizing one or more part feature may include finding a subgraph that matches a predefined feature graph. In other cases, processor 104 may decompose volume of part 116 into a plurality of simpler volumes, wherein intersection of the plurality of simpler volumes may represent one or more-part features.

With continued reference to FIG. 1, in some cases, one or more machine learning processes may be used by processor 104 to generate pin placement schema 124. In some embodiments, processor 104 may scan at least one 3D CAD model using a computer vision module. As used in this disclosure, a "computer vision module" is a component configured to perform one or more computer vision tasks. "Computer vision," as used in this disclosure is defined as a field of artificial intelligence (AI) enabling computing device to derive information from visual data such as images and/or videos. In some cases, computer vision tasks e.g., feature extraction, image/video interpretation, and/or image/video analysis may be performed on set of part images as described above. In an embodiment, computer vision module may be configured to receive plurality of 2D prints or 2D drawings of part 116. In some cases, computer vision module may also take 3D model of part 116 as input. In a non-limiting example, computer vision module may include a (3D) convolutional neural networks (CNNs) trained on part data 112 such as labeled CAD data to recognize plurality of part features as described herein. In some cases, labeled CAD data may include a plurality of CAD models as input correlated to a plurality of part feature sets as output. In some cases, such labeled CAD data may be received from part data store 120 or from one or more user inputs made by the entity.

With continued reference to FIG. 1, in some cases, plurality of part features 128 may be ranked based on a pre-determined weight of each part feature of plurality of part features 128. In some cases, weights may be manually labeled by a professional e.g., a part manufacturer or a mold designer. In some cases, weights may be calculated by processor 104, for example, and without limitation, processor 104 may be configured to determine a priority of pin placement of part 116 based on plurality of part features 128 e.g., 1) pin on ribs and 2) pin on floor. In some instances, part features such as ribs may be given a higher priority due to their structural significance and potential challenges associated with manufacturing and assembly processes of corresponding part 116. In some cases, ranking of plurality of part features may be as follows: 1) intersections, 2) boss, 3) corners, 4) ends, 5) interval, 6) floor, and 7) holes, and weights associated to the plurality of part features may be calculated based on the ranking. In a non-limiting example, a rule-based engine may be constructed to rank plurality of identified part features and match each part feature with at least one pin placement configuration 132. It should be noted that the aforementioned rankings are merely illustrative and represent a potential ranking for plurality of part features.

With continued reference to FIG. 1, in some cases, processor 104 may determine one or more alternative rankings based on different situations, specific design considerations, and user needs. In some cases, apparatus 100 may employ one or more machine learning algorithms that have been trained on training data containing dataset describing previous pin placement scenarios, part design variations, user feedback, and/or the like. In some cases, processor 104 may be configured to use different set of weights, wherein the decision on which set of weights to user may be based on various factors including, without limitation, context of part design e.g., complexity of part 116, its functionality or intended use, materials involved, and/or the like. In some cases, processor 104 may be configured to utilize multiple predefined weight sets for different common pin placement scenarios or parts. In a non-limiting example, when a new part is introduced, and plurality of part features are identified, processor 104 may compare newly identified part features against the previously identified part features and select at least a set of weights that aligns most closely with historical part features. Additionally, or alternatively, processor 104 may determine set of weights as a function of a user profile; for instance, and without limitation, if entity has consistently preferred certain feature priority in the past, processor 104 may prioritize those features in the future. It should be noted that the provided ranking should not be construed as limiting the scope of this disclosure. As a person skilled in the art, upon reviewing the entirety of this disclosure, will recognize apparatus 100 as described herein may be adaptable, therefore may accommodate various ranking algorithms tailored to unique requirements of different applications.

With continued reference to FIG. 1, as used in this disclosure, a "rule engine," as described herein, refers to a computational system that uses a set of predefined rules (or criteria) to make decisions based on input data, wherein each "rule" within the set of rules, for the purpose of this disclosure, is a specific criterion or condition that dictates what, where, and how pins should be placed in relation to the identified part features. In some cases, a rule may include a correlation between at least one part feature and at least one pin placement configuration 132. In some cases, plurality of part features 128 may be input into rule engine. Rule engine may be configured to evaluate plurality of part features 128 and determine one or more pin placement configurations 132 e.g., desired pin locations, desired pin diameter at a particular pin location, pin angle, pin type, and/or the like. In some cases, a set of predefined rules may be based on structural requirements, manufacturing constraints, functional needs, or any combination thereof.

With continued reference to FIG. 1, in a non-limiting example, pin placement configurations 132 may be determined based on priority of part features (i.e., ranking) as described above, wherein the pre-determined set of rules may include one or more priority rule for ranking plurality of part features 128 such as, "pins should be placed before any other part features: intersections>boss>corners>ends>pins." In some cases, plurality of part features 128 may include one or more combined features (i.e., complex part feature formed by multiple part features); For instance, and without limitation, pre-determined set of rules may include a rule specifying "intersection of hex and rib takes priority over hex pin placement." In some cases, plurality of part features may be grouped and/or categorized at a surface level. In a non-limiting example, if pins don't fit on part surface, locations of these pins may be moved to next level surface e.g., floor. In some cases, one or more rules may be combined to determine pin placement configurations 132. Continuing with the non-limiting example, a second rule such as "pins placed on along either edge of part floor is considered as perimeter pins," and a third rule such as "part should have a maximum of x number of perimeter pins" may be combined with the rule of dropping pins to next level if pins dimension out of bounds. Pin placement configurations 132 such as pin locations may be determined and/or consolidate on secondary surface relative to primary surface. In this case, placing pins on floor may not be needed as the amount of perimeter pins (or previously determined locations of perimeter pins) may be sufficient. Maximum number of perimeter pins (i.e., third rule) may be exceeded or violated for such pin placement.

With continued reference to FIG. 1, other exemplary embodiments of rules may include orientation rules (e.g., the angle of the pin should align with primary force direction expected on part 116), material compatibility rule (e.g., pin material should be compatible with the material of part feature it is being placed one, to prevent issues such as corrosion or wear), functional rules (e.g., pins placed on functional feature such as holes or slots should not obstruct the primary functions of the that feature) As a person skilled in the art, upon reviewing the entirety of this disclosure, will be aware of various rules rule engine may employ in determining plurality of pin placement configurations 132. In some cases, rule engine may include an inference engine configured to evaluate set of pre-defined rules against provided set of part features and/or any other part data 112. Additionally, or alternatively, other pin placement configurations such as pin length, pin material, pin shape, pin surface finish, pin placement patterns and/or the like may also be determined by processor 104 during the generation of pin placement schema.

With continued reference to FIG. 1, in some embodiments, one or more machine learning models may be trained and configured to generate pin placement schema directly or indirectly 124. In some cases, Processor 104 may utilize a machine learning module to implement one or more algorithms or generate one or more machine learning models to determine plurality of pin placement configurations 132 and/or generate pin placement schema 124 as described above. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may include finite element part ejection simulation, which predicts sticking forces and simulate part breakage due to the ejection forces induced by the ejector pins. Training data may include finite element mold flow simulation, which simulates parts distortion and sticking. In some cases, generating pin placement schema may include training through finite element mechanical ejection simulation for trial pin placement. Poor pin placements are evaluated by finite element simulation (mechanical simulation) and scored negatively. For those successfully ejected by the mechanical simulation obtains higher score. With these scores of successful ejections, the machine learning algorithm trains the optimum pin placement for generating pin placement schema. Training data may contain correlations that a machine-learning process may use to model relationships between two or more categories of data elements. Exemplary inputs and outputs may come from part data store 120 as described herein or any other databases, or even be provided by entity. In a non-limiting example, machine-learning module may obtain a training set by querying part data store 120 that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. In a further embodiment, training data may include previous outputs such that one or more machine learning models iteratively produces outputs.

With continued reference to FIG. 1, in some cases, generating pin placement schema 124 may include training a pin placement machine learning model using pin placement training data, wherein pin placement training data may include a plurality of part data as input correlated to a plurality of pin placement schemas as output. In an embodiment, pin placement training data may include a plurality of CAD models, each correlated to at least one pin placement schema 124 containing one or more pin placement configurations 132. In other cases, pin placement training data may include a plurality of part features as input correlated to a plurality of pin placement configurations as output. Processor 104 may then generate pin placement schema as a function of input data e.g., part data 112 and/or plurality of part features 128, using the trained pin placement machine learning model.

With continued reference to FIG. 1, in some cases, processor 104 may be configured to identify a plurality of boundary elements (i.e., discrete components or entities that define the outer limits or edges of a shape or structure) based on plurality of part features 128 and determine at least one pin placement configuration 132 that match with adjacent part features during the pin placement schema generation. In some cases, boundary elements may include, without limitation, points, lines, curves, or even surface, depending on the dimensionality of part 116. In a non-limiting example, plurality of boundary elements may be used by processor 104 for determining desired pin diameter. Processor 104 may be configured to calculate a pin diameter threshold as a function of plurality of boundary elements and determining a desired pin diameter as a function of the calculated pin diameter threshold. In an embodiment, at least two vertices (i.e., points where two or more lines or edges meet) and at least one edge may dictate a diameter constraint e.g., a maximum diameter of a pin that can be placed without overlapping or interfering with adjacent features.

With continued reference to FIG. 1, in some embodiments, one or more selections of pin 140 may include one or more selections from plurality of pins that are currently available. In some cases, pins may be selected based on desired pin diameter as described above. In a non-limiting example, processor 104 may be configured to query a connected database such as part data store 120 as described above or a pin lookup table (LUT) as illustrated below to find at least one pin having a pin diameter that is closest to the calculated pin diameter threshold:

| PIN ID | PIN DIAMETER | PIN HEIGHT | PIN SPACING |
| --- | --- | --- | --- |
| 1 | 1.18872 | 6.35 | 12.7 |
| 2 | 1.5875 | 6.35 | 12.7 |
| 3 | 2.38252 | 6.35 | 15.875 |
| 4 | 3.175 | 6.35 | 19.05 |
| 5 | 6.35 | 11.1252 | 25.4 |
| 6 | 9.525 | 15.875 | 38.1 |
| 7 | 12.7 | 15.875 | 38.1 |

Each data entry within the pin lookup table may describe an available pin and associated specification (in columns) including, without limitation, pin diameter, pin height, pin spacing, and/or the like. In some cases, these measurements may include a uniform unit e.g., in millimeter (mm). In a non-limiting example, pin No. 1 may have a pin diameter of 1.18872 mm, a height of 6.35 mm, and a recommended spacing between two adjacent pins (when placed in the mold) of 12.7 mm. It should be noted that the above-listed pins and their specifications are provided solely for illustrative purposes and are not intendent to be exhaustive or limiting in any manner. The specific numbers, dimensions, and details mentioned in the above table are merely representative examples. Other columns such as, without limitation, material, maximum ejection force, manufacture, part number, and/or the like may also be included. As a person skilled in the art, upon reviewing the entirety of this disclosure, will be aware of various variations, modifications, and other specifications not explicitly mentioned herein may be contemplated in light of the current disclosure.

With continued reference to FIG. 1, additionally or alternatively, generating pin placement schema may include generating associated metadata based on part data 112. In a non-limiting example, pin placement schema 124 may include an illustration of force and moment distribution. In some cases, data on how the ejection force is distributed across pins and the moments on the part are balanced and corresponding regions of part 116 may be provided by pin placement schema 124 in addition to one or more of pin placement configurations 132 as described above. In some cases, one or more part features, for example, critical (i.e., high ranking) features or areas of part 116 that may influence the decision-making process of pin placement such as thin walls, ribs, bosses, among others, and/or pin placement configurations 132 that match with these features may be provided by pin placement schema. Metadata such as, without limitation, schema version, creation timestamp, associated part type, molding machine specification, material recommendations, associated documents, dependencies and/or the like may also be provided alongside.

With continued reference to FIG. 1, processor 104 is configured to provide a pin placement quote 144 based on pin placement schema 124. As used in this disclosure, a "pin placement quote" is a detailed proposal or estimate provided to entity or internal stakeholders, specifying considerations associated with pin placement process in injection molding. In some embodiments, pin placement quote 144 may include one or more cost estimation, timeframe estimation, recommendations, specifications of pins, visual representation of at least a part 116, potential risks and risks mitigations, terms and conditions, and/or the like as described in detail below. In some cases, pin placement schema 124 may act as a foundational blueprint for pin placement quote 144, for example, and without limitation, by specifying pin placement configurations 132 such as, pin types, sizes, and materials, and/or the like.

With continued reference to FIG. 1, in some cases, processor 104 may be configured to generate projected part data 148 by overlaying pin placement schema 124 onto part data 112. As used in this disclosure, "projected part data" is a composite or synthesized data representation of at least a part 116 wherein specific attributes, guidelines, and/or configurations within pin placement schema 124 have been superimposed or overlaid onto the original part data 112 related to at least a part 116. In a non-limiting embodiment, projected part data 148 may include a visual or data-driven amalgamation of part design with one or more proposed pin placements. In some cases, projected part data 148 may be configured to provide a comprehensive view of how the final molded part will appear post-election, factoring in the influence of plurality of pins placed in injection molding apparatus for ejecting the part during injection molding process as described above.

With continued reference to FIG. 1, in some cases, generating projected part data 148 may include merging part data 112, which outlines part's design, geometry, part features 128, and/or the like with pin placement schema 124. Stakeholders e.g., designers, engineers, customers, among others may be able to view a holistic visual representation of at least a part 116 within pin placement. In an embodiment, overlaying pin placement schema 124 may include registering a plurality of graphical markers 152 on part data 112, wherein each graphical marker of the plurality of graphical markers 152 may denote a visual representation of the at least one pre-defined pin placement configuration. As used in this disclosure, a "graphical marker" is a distinct, often symbolic, visual element introduced onto part data 112. In some cases, each graphical marker of plurality of graphical markers 152 may be configured to provide a clear, unmistakable visual cue representing specific attributes or configurations such as, without limitation, the precise locations, orientations, or types of pins.

With continued reference to FIG. 1, in a non-limiting example, plurality of graphical markers 152 may include a plurality of dots or crosses, each indicating a pin position. In some cases, more complex symbols may be used to denote specific pin types or orientations. For instance, and without limitation, projected part data 148 may include a detailed CAD diagram or at least a portion of the CAD diagram with plurality of pin locations and corresponding pin selections projected on the surface of CAD model illustrated in the diagram. These pin placement configurations may be marked with colored graphical markers (e.g., a red dot). In some cases, the size of each dot may correspond to the diameter of the pin, with larger dots indicating wider pins. In some cases, annotations (i.e., metadata) may be displayed next to each dot, configured to provide additional information, such as the exact coordinates, pin length, orientation, and/or the like. Injection molding apparatus and/or an operator may automatically and/or manually position plurality of pins on molding halves according to the generated projected part data 148.

With continued reference to FIG. 1, in some embodiments, computer vision model as described above may be configured to facilitate the process of overlaying the pin placement schema 124. In some cases, computer vision model may rely on input e.g., at least a CAD model or one or more part images taken from the at least a CAD model to generate projected part data 148. To achieve a precise overlay, one or more techniques such as object recognition, feature detection, and edge/corner detection may be employed by computer vision model. Examples of feature detections may include, but are not limited to, scale invariant feature transform (SIFT), Canny edge detection, Shi Tomasi corner detection, and the like. The term "registration," for the purpose of this disclosure, refers to the alignment or mapping of the graphical markers 152 onto the part data 112. This could necessitate certain transformations to ensure the camera frame is oriented relative to a three-dimensional coordinate system; exemplary transformations include without limitation homography transforms and affine transforms.

With continued reference to FIG. 1, in an embodiment, registration of first graphical marker to a coordinate system may be verified and/or corrected using object identification and/or computer vision, as described above. For instance, and without limitation, an initial registration to two dimensions part images, represented for instance as registration to the x and y coordinates, may be performed using a two-dimensional projection of points on first graphical marker in three dimensions; however. a third dimension of registration, in case of registering plurality of graphical markers 152 directly on at least one CAD model, representing depth and/or a z axis, may be detected by comparison of two part images; for instance, where first part image includes a pair of images captured based on the CAD model, image recognition and/or edge detection software may be used to detect a pair of stereoscopic views of at least a part 116; two stereoscopic views may be compared to derive z-axis values of points on object permitting, for instance, derivation of further z-axis points within and/or around part 116 using interpolation. In some cases, this may be repeated for multiple parts in part data 112.

With continued reference to FIG. 1, in another embodiment, x and y axes may be chosen to span a plane common to two points of view (i.e., placements of virtual camera) used for stereoscopic image capturing and/or an x-y plane of a first part image; a result, x and y translational components and ø may be pre-populated in translational and rotational matrices, for affine transformation of coordinates of object, also as described above. Initial x and y coordinates and/or guesses at transformational matrices may alternatively or additionally be performed between first part image and second part image, as described above. For each point of a plurality of points and/or edges of each graphical marker of plurality of graphical markers 152, x and y coordinates of a first stereoscopic image may be populated, with an initial estimate of z coordinates based, for instance, on assumptions about the graphical marker, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

With continued reference to FIG. 1, providing pin placement quote 144 includes determining a list of quote parameters 156. As used in this disclosure, "quote parameters" are a set of factors that are taken into consideration when preparing pin placement quote 144. In some embodiments, list of quote parameters 156 may provide a structured framework that ensures pin placement quote 144 generated and/or provided is tailored to specific requirements listed in pin placement schema 124 and/or requested by entity. In some cases, list of quote parameters 156 may include at least one quantitative value 160 associated with an initiation of the injection molding process of the at least a part, wherein the at least one "quantitative value," for the purpose of this disclosure, is any numerically-expressive variable that influence the injection molding process. In a non-limiting example, at least one quantitative value 160 may include part quantity, total manufacturing cost, labor cost, operational cost, energy consumption, shipping fees, and/or the like. In some cases, each pin may be associated with a different price. A selection of a larger pin may be more expensive than a selection of a smaller pin, or vice versa.

With continued reference to FIG. 1, in some cases, list of quote parameters 156 may include a temporal element 164 describing a span from the initiation of the injection molding process to a final receipt of at least a part 116. As used in this disclosure, a "temporal element" is a parameter that captures at least one chronological aspect of the injection molding process. In some cases, temporal element 164 may outline an anticipated duration e.g., an estimation of time associated with specific milestones, phases, or the entirety of injection molding process. In some cases, temporal element 164 may denote a start and end date and times. In other cases, more comprehensive spectrum of time-related facets such as, without limitation, any interval, delays, anticipated halts, acceleration opportunities may also be included by temporal element 164. In a non-limiting example, temporal element 164 may signify an estimated lead time required for mold fabrication, actual molding process duration, cooling and setting times, post-processing durations, delivery timeframe including shipping or transit time to final destination. In another non-limiting example, a list of quote parameters 156 may include a plurality of temporal elements 164 forming a timeline from mold setup to product delivery.

With continued reference to FIG. 1, other exemplary embodiments of quote parameters 156 may include, without limitation, parameters related to machinery and equipment (e.g., injection molding machine usage, machine type, maintenance cost, and/or the like), quality assurance and testing (e.g., testing time, methods, and results), logistics (e.g., packaging, shipping, and handling), contingency factors (e.g., unforeseen delays, rush orders, and/or the like), among others. As a person skilled in the art, upon reviewing the entirety of this disclosure, will be aware of various quote parameters 156 may be determined by processor 104.

With continued reference to FIG. 1, in some cases, determining list of quote parameters 156 may include determining a complexity score 168 associated with at least a part 116 as a function of projected part data 148 and determining list of quote parameters 156 as a function of the complexity score 168. As used in this disclosure, a "complexity score" is a metric that quantifies an intricacy, difficulty, or multifaceted nature of a given object, task, or process, such as, without limitation, manufacturing at least a part 116 under projected part data 148 as described above. Complexity score 168 may include a numeric value or a range of numeric values. In a non-limiting example, complexity score may include a value between 0 and 1, wherein 0 may be a minimum complexity and 1 may be a maximum complexity. In some cases, complexity score 168 may be calculated based on the number and intricacy of plurality of part features 128 or components at least a part 116 has, for instance, and without limitation, a higher number of part features having intricate details may result in a higher complexity score. In some cases, complexity score 168 may be calculated based on pin placement configurations 132, for example, and without limitation, a higher number of pin locations may indicate more pins are required during the ejection process, leading to a higher cost. In some cases, the level of interconnectedness of dependencies between various components (of injection molding machine), system where multiple parts of the injection molding machine interact closely or depend on each other may have a higher score. Evaluated categories as listed herein may be weighted based on a pre-determined importance or potential challenges labeled by entity. For instance, mold design challenges may be given a higher weight than material considerations. One or more complexity scores may be aggregated and/or averaged to a comprehensive complexity score. Additionally, or alternatively, complexity score may include a categorical variable e.g., "low," "intermediate," and "high."

With continued reference to FIG. 1, in a non-limiting example, processor 104 may be configured to compute a complexity score associated to at least one CAD model according to Willmore energy: $\int_s (H^2-K)dA$, where H is the mean curvature and K is the gaussian curvature of the at least one CAD model at a given point on the surface S, and dA is the area from of surface S. In some cases, such complexity score may be always nonnegative (0 for sphere); for instance, and without limitation, the bumpier the model surface, the higher complexity score may be. In another non-limiting example, complexity score 168 may be calculated by classifying the "smoothness" of at least one CAD model with pin placement schema 124 overlaid on it. In some cases, each pin placement specified by pin placement schema 124 may affect the smoothness of manufactured part 116 since it leaves a small mark on the surface of molded part. Processor 104 may be configured to discretize the mean curvature as a function of a gradient of a surface area of a given surface of the part model, wherein the gradient of the surface area may be the mean curvature normal as defined by $\nabla A=2Hn\hat{}$. Calculating complexity score 168 may include calculating the gradient of the part's surface area (including or subtracting area covered by plurality of graphical markers 152 i.e., pin areas) with respect to a moving vertex $v_i$:$B_i^2H_i^2=1/n\|\partial A/\partial vi\|^2$, where $B_i$ is the barycentric area of vertex i, n is the number of edges of the given surface (e.g., n=3 for triangular faces, n=4 for quadrilaterals, and so on). Alternatively, or additionally, Dirichlet energy for each point r on a part surface S (in spherical coordinate) of at least a CAD model may be measured: $\int_s \|\nabla r\|^2$ as complexity score 168 (modeled by "bumpiness").

With continued reference to FIG. 1, in some cases, complexity score 168 may directly or indirectly affect determination of quote parameters 156 as described herein. In some cases, a higher complexity score may indicate a higher quantitative value 160 and/or temporal element 164. In a non-limiting example, complex tasks may necessitate skilled labor, leading to an increased labor costs. In another non-limiting example, high complexity score may require advanced machinery e.g., specialized molds, additional tolling, and/or the like to implement pin placement schema 124. In yet another non-limiting example, part 116 associated with higher complexity score may require longer injection molding process. In a further non-limiting example, high complexity score may denote a higher risk of errors defects, or manufacture challenges, resulting in including contingency parameters in pin placement quote 144, covering potential reworks, or extended timelines.

With continued reference to FIG. 1, in some cases, determining list of quote parameters 156 may include a utilization of one or more machine learning models. In some embodiments, machine learning module may be configured to generate a quote parameter estimation model 172, wherein generating the quote parameter estimation model 172 May include training, using quote parameter training data, the quote parameter estimation model 172. In some cases, quote parameter training data may include a plurality of projected part data, along with corresponding complexity score as input, correlated to a plurality of quote parameter lists as output. In some cases, quote parameter training data may be received from part data store 120. In a non-limiting example, historical order data may be used to generate quote parameter training data to train quote parameter estimation model 172. In other cases, quote parameter training data may include manual labeled (projected) part data provided by one or more entities e.g., users and/or CAD software. In some embodiments, quote parameter estimation model may include regression model; for instance, and without limitation, linear regression model, Ridge and lasso regression model, and/or the like. Other exemplary machine learning models such as, without limitation, decision trees, random forests, neural networks, and/or the like as described below with reference to FIG. 3 may also be used for quote parameters estimation purposes. Processor 104 may then be configured to determine list of quote parameters 156 as a function of projected part data 148 using the trained quote parameter estimation model.

With continued reference to FIG. 1, additionally, or alternatively, a quote parameter lookup table (LUT) that map complexity scores 168 to corresponding lists of quote parameters 156 may be used to replace heavy runtime computations with array indexing operation. In some cases, saving in terms of processing time may be significant, since retrieving values e.g., lists of quote parameters 156 from memory is faster than undergoing an "expensive" computation (e.g., executing one or more machine learning models as described above) or I/O operation. In some embodiments, quote parameter LUT may include a pre-populated list of quote parameter sets, wherein each data entry in LUT may correspond to a complexity score or category. Determining list of quote of parameters 156 may include searching quote parameter LUT based on complexity score 156.

With continued reference to FIG. 1, processor 104 is configured to formulate pin placement quote 144 by associating list of quote parameters 156 with projected part data 148. In some cases, formulating pin placement quote 144 may include directly associating projected part data 148, e.g., visualization of part 116 with pin placement schema 124 overlaid that showcase proposed pin locations, pin sizes, orientations, and other relevant information as described herein to one or more quote parameters 156 such as, without limitation, material costs, manufacturing cost, labor fees, machinery availability, time taken for manufacturing part 116, estimated delivery time, and/or the like. In some cases, such association may include a linear mapping. One or more machine learning models e.g., regression model or decision trees as described herein may be used in pin placement quote 144 formulation. In some cases, feature engineering algorithms such as principal component analysis (PCA) or feature selection methods such as recursive feature elimination (RFE) may be used refine list of quote parameters 156 and/or projected part data 148, preserving parameters/data that significantly influence the pin placement quote. In a non-limiting example, a regression model, such as Ridge or Lasso Regression may be employed to map projected part data 148 having plurality of part features P with one or more graphical markers 152 (i.e., pin placement schema 124) to list of quote parameters 156 (i.e., array of quote values V):

$$V_i = f(P) = w_1 p_1 + w_2 p_2 + \ldots + w_{n-1} p_{n-1} + w_n p_n + b$$

Where $w_1, w_2, \ldots, w_{n-1}, w_n$ are learned weights or coefficients for each features and b is a bias term. In some cases, weights may include rankings associated with plurality of part features as described above. Processor 104 may aggregate data such as, without limitation, part data 112, quantitative values 160 (e.g., cost estimates), temporal elements 164 (e.g., delivery timeframes), qualitative data (e.g., pin placement schema 124), and/or the like into pin placement quote 144. It should be noted that other exemplary methods such as, without limitation, support vector machine (regression for non-linear), cluster-based pricing, ensemble learning (e.g., boosting and bagging), time series analysis (takes additional consideration of historical data e.g., historical order data), Bayesian models, rule engine, and/or the like may be employed to formulating pin placement quote 144.

With continued reference to FIG. 1, in some cases, formulating pin placement quote 144 may include generating a pin placement recommendation 176 as a function of list of quote parameters 156. As used in this disclosure, "pin placement recommendations" are information related to specific locations, orientations, and configurations wherein pins should be placed to achieve desired molding results. In some cases, these recommendations may be based on various factors, including but not limited to, the geometry of the part 116, material used, cooling requirements, expected stresses during the molding process, and/or the like. In some cases, each pin placement recommendation may be accompanied by a rationale e.g., a reason of why a particular pin placement is suggested. In a non-limiting example, pin placement recommendation 176 may include a suggestion about optimal number of pins, their specific locations, and/or types. In another non-limiting example, pin placement recommendation 176 may, alternatively, or additionally, include potential modifications to part data 112. In some cases, pin placement recommendation 176 may suggest enhancing the moldability of at least a part 116 to simplify the ejection process with proposed pin placement post-molding. For example, and without limitation, generating pin placement recommendation 176 may include recognizing one or more inherent trade-offs exist between entity-provided part design and estimated molding efficiency such as modifying a curve, adding or removing a recess, changing a feature's dimension, and/or the like.

With continued reference to FIG. 1, in some cases, a recommendation engine may be implemented by processor 104 using one or more optimization algorithms such as, without limitation, genetic algorithms, particle swarm optimization (PSO), simulated annealing, and/or the like to refine pin placement schema 124 given a constraints set by list of quote parameters 156. In some cases, deep learning models such as convolutional neural networks (CNN) as described below may be employed for processing and analyzing part data 112 and pin placement schema 124, generating new CAD model based on pin placement recommendation 176, and/or the like. In some cases, a simulation software may be incorporated by recommendation engine, wherein the simulation software may be configured to model an injection molding process as a function of projected part data 148 or pin placement schema 124 alone. In some cases, entity may visually inspect such simulation through user interface as described in detail below. Processor 104 may generate a pin placement recommendation including a second pin placement schema based on the virtual simulation result of how part 116 will be molded with first pin placement schema using the recommendation engine. In some cases, one or more graphical processing units (GPUs) may be leveraged to perform simulations, machine learning model inferences, and/or any other processing step that require heavy computational resources as described herein, expediting the processing time and enhance recommendation engine's efficiency. In case wherein processing needs exceed the capabilities of on-premise resources, recommendation engine may be offloaded to one or more cloud-based platforms.

With continued reference to FIG. 1, in one or more embodiments, recommendation engine may implement one or more aspects of "generative artificial intelligence (AI)," a type of AI that uses machine learning algorithms to create, establish, or otherwise generate data such as, without limitation, part data 112, pin placement schema 124, projected part data 148, pin placement recommendation 176, and/or the like in any data structure and dimensionality as described herein (e.g., text, image, video, among others) that is similar to one or more provided training examples. In an embodiment, machine learning module described herein may generate one or more generative machine learning models that are trained on one or more set of pin placement examples. One or more generative machine learning models may be configured to generate new examples that are similar to the training data of the one or more generative machine learning models but are not exact replicas; for instance, and without limitation, data quality or attributes of the generated examples may bear a resemblance to the training data provided to one or more generative machine learning models, wherein the resemblance may pertain to underlying patterns, features, or structures found within the provided training data.

With continued reference to FIG. 1, in some cases, generative machine learning models may include one or more generative models. As described herein, "generative models" refers to statistical models of the joint probability distribution P(X, Y) on a given observable variable x, representing features or data that can be directly measured or observed (e.g., part data 112) and target variable y, representing the outcomes or labels that one or more generative models aims to predict or generate (e.g., pin placement schema 124, projected part data 148, pin placement recommendations 176, among others). In some cases, generative models may rely on Bayes theorem to find joint probability; for instance, and without limitation, Naïve Bayes classifiers may be employed by recommendation engine to categorize input data into different annotations and/or labels such as, without limitation, "optimal," "sub-optimal," "defective," and/or the like based on the outcome of a particular pin placement schema. In a non-limiting example, one or more generative machine learning models may include one or more Naïve Bayes classifiers generated, by processor 104, using a Naïve bayes classification algorithm as described in detail below with reference to FIG. 3.

With continued reference to FIG. 1, in some cases, one or more generative machine learning models may include generative adversarial network (GAN). As used in this disclosure, a "generative adversarial network" is a type of artificial neural network with at least two sub models (e.g., neural networks), a generator, and a discriminator, that compete against each other in a process that ultimately results in the generator learning to generate new data samples, wherein the "generator" is a component of the GAN that learns to create hypothetical data by incorporating feedbacks from the "discriminator" configured to distinguish real data from the hypothetical data. In some cases, generator may learn to make discriminator classify its output as real. In an embodiment, discriminator may include a supervised machine learning model while generator may include an unsupervised machine learning model as described in further detail with reference to FIG. 3.

With continued reference to FIG. 1, in an embodiment, discriminator may include one or more discriminative models, i.e., models of conditional probability P(Y|X=x) of target variable Y, given observed variable X. In an embodiment, discriminative models may learn boundaries between classes or labels in given training data. In a non-limiting example, discriminator may include one or more classifiers as described in further detail below with reference to FIG. 3 to distinguish between different categories e.g., "helpful" or "unhelpful," or states e.g., TRUE vs. FALSE within the context of generated data such as, without limitations, pin placement recommendation 176, and/or the like. In some cases, recommendation engine may implement one or more classification algorithms such as, without limitation, Support Vector Machines (SVM), Logistic Regression, Decision Trees, and/or the like to define decision boundaries.

With continued reference to FIG. 1, generator of GAN may be responsible for creating synthetic data that resembles "real" (i.e., helpful) pin placement recommendation. In some cases, GAN may be configured to receive projected part data 148 such as, without limitation, a CAD model within plurality of pin locations marked by plurality of graphical markers 152, as input and potentially generates corresponding pin placement recommendation 172 containing information describing or evaluating the current pin placement schema 124 and a modified CAD model generated by recommendation engine. On the other hand, discriminator of GAN may evaluate the authenticity of the generated content by comparing it to real pin placement recommendations, for example, discriminator may distinguish between genuine and generated content and providing feedback to generator to improve the recommendation engine performance.

With continued reference to FIG. 1, in other embodiments, one or more generative models may also include a variational autoencoder (VAE). As used in this disclosure, a "variational autoencoder" is an autoencoder (i.e., an artificial neural network architecture) whose encoding distribution is regularized during the model training process in order to ensure that its latent space includes desired properties allowing new data sample generation. In an embodiment, VAE may include a prior and noise distribution respectively, trained using expectation-maximization meta-algorithms such as, without limitation, probabilistic PCA, sparse coding, among others. In a non-limiting example, VEA may use a neural network as an amortized approach to jointly optimize across input data and output a plurality of parameters for corresponding variational distribution as it maps from a known input space to a low-dimensional latent space. Additionally, or alternatively, VAE may include a second neural network, for example, and without limitation, a decoder, wherein the "decoder" is configured to map from the latent space to the input space.

In a non-limiting example, and still referring to FIG. 1, VAE may be used by recommendation engine to model complex relationships between part data 112 and proposed pin placement schema 124. In some cases, VAE may encode input data into a latent space, capturing list of quote parameters 156. Such encoding process may include learning one or more probabilistic mappings from observed projected part data 148 to a lower-dimensional latent representation. Latent representation may then be decoded back into the original data space, therefore reconstructing the projected part data 148. In some cases, such decoding process may allow VAE to generate new examples or variations that are consistent with the learned distributions. Additionally, or alternatively, one or more generative machine learning models may utilize one or more predefined templates representing, for example, and without limitation, correct pin placement recommendation. In a non-limiting example, one or more pin placement recommendation templates (i.e., predefined models or representations of correct and helpful pin placement recommendation) may serve as benchmarks for comparing and evaluating plurality of generated pin placement recommendations 176.

With continued reference to FIG. 1, other exemplary embodiments of generative machine learning models may include, without limitation, long short-term memory networks (LSTMs), (generative pre-trained) transformer (GPT) models, mixture density networks (MDN), and/or the like. As an ordinary person skilled in the art, upon reviewing the entirety of this disclosure, will be aware of various generative machine learning models that may be used to generate pin placement recommendation 176 as described herein.

With continued reference to FIG. 1, in a further non-limiting embodiment, machine learning module may be further configured to generate a multi-model neural network that combines various neural network architectures described herein. In a non-limiting example, multi-model neural network may combine LSTM for time-series analysis with GPT models for natural language processing. Such fusion may be applied by recommendation engine to generate pin placement recommendation 176. In some cases, multi-model neural network may also include a hierarchical multi-model neural network, wherein the hierarchical multi-model neural network may involve a plurality of layers of integration; for instance, and without limitation, different models may be combined at various stages of the network. Convolutional neural network (CNN) may be used for image feature extraction, followed by LSTMs for sequential pattern recognition, and a MDN at the end for probabilistic modeling. Other exemplary embodiments of multi-model neural network may include, without limitation, ensemble-based multi-model neural network, cross-modal fusion, adaptive multi-model network, among others. As an ordinary person skilled in the art, upon reviewing the entirety of this disclosure, will be aware of various generative machine learning models that may be used to generate pin placement recommendation 176 described herein. As an ordinary person skilled in the art, upon reviewing the entirety of this disclosure, will be aware of various multi-model neural network and combination thereof that may be implemented by apparatus 100 in consistent with this disclosure.

With continued reference to FIG. 1, additionally, or alternatively, recommendation engine may include a user feedback system. In some cases, one or more feedback loops where entities e.g., users may approve, modify, or reject generated pin placement recommendations 176 may be incorporated by recommendation engine. In some cases, processor 104 may dynamically generate new pin placement recommendation or revise existing pin placement recommendation based on a received user input 180. In some cases, recommendation engine may be configured to analyze each feedback iteration to determine one or more user preferences and/or requirements. Patterns in user input 180, for instance, frequent modifications in certain direction or common rejection reasons, may be used to fine-tune algorithms implemented by recommendation engine. In some cases, hyperparameters of one or more machine learning models as described herein may be adjusted based on user input 180. In other cases, user input and newly generated output e.g., modified pin placement recommendations, modified pin placement schema 124, modified part data 112 may be added to training data to retrain the machine learning models.

With continued reference to FIG. 1, in a non-limiting example, processor 104 may be configured to recalibrate projected part data 148 upon an implementation of pin placement recommendation 176 based on user input 180. As used in this disclosure, to "recalibrate," means to adjust, refine, or update projected part data 148 in light of new or modified information presented in pin placement recommendation 176. In some cases, once processor 104 receive user input 180 regarding pin placement recommendation 176, projected part data 148 may be accessed e.g., modified to incorporate the user's feedback. In some cases, modified projected part data 148 may be overlaid onto or displayed next to the original projected part data 148 to visualize the change in real-time. In some cases, user input 180 may be interpreted e.g., whether the user input is in the form of textual comments, graphical sketches, or even direct manipulation in user interface as described below. Intent behind such user input may be discerned and translated into actionable modifications in projected part data 148. Recommendation engine may be configured to consistently monitor for subsequent user inputs and checks if the recalibrated projected part data still meets the molding requirements and standards. In some cases, recommendation engine may detect discrepancies and alert or prompts entity suggesting further refinements. In a non-limiting example, recalibrated projected data may be forwarded to simulation software to evaluate the new pin placements or quote parameter estimation model 172 to re-evaluate quantitative value 160 e.g., financial implications of the project.

With continued reference to FIG. 1, in some embodiments, list of quote parameters 156 may be updated based on pin placement recommendation. For instances, and without limitation, if pin placement recommendation 176 suggests an arrangement that requires fewer pins, specialized pins, or more elaborate steps, quantitative values 160 such as cost parameters in the list may be adjusted accordingly. In a non-limiting example, a pin placement configuration that enhances the efficiency of the injection molding process may reduce operational costs. In some cases, temporal element such as projected time for the injection molding process may be updated based on pin placement, for example, a pin placement recommendation 176 that leads to faster cooling or setting times may reduce the overall production time, which would in turn affect delivery estimates in the quote parameters 156. Other quote parameters such as, without limitation, material requirements, quality assurance, equipment and labor, contingency factors may be modified to ensure that pin placement quote 144 remains reflective of the current information available.

With continued reference to FIG. 1, processor 104 is configured to display pin placement quote 144 to entity using a user interface 184 at a display device 188. In some cases, pin placement quote 144 including list of quote parameters 156 and other data described herein such as, without limitation, part data 112, pin placement schema 124, pin placement recommendation 176 and/or the like may be transmitted, by processor 104, to one or more display devices 184 communicatively connected to processor 104, for example, and without limitation, user devices having at least one display capable of presenting a user interface 184 e.g., graphical user interface (GUI) to end user e.g., entity. As used in this disclosure, a "display device" refers to an electronic device that visually presents information to the entity. In some cases, display device 188 may be configured to project or show visual content generated by computers, video devices, or other electronic mechanisms. In some cases, display devices may include, without limitation, a liquid crystal display (LCD), a cathode ray tube (CRT), a plasma display, a light emitting diode (LED) display, and any combinations thereof. In a non-limiting example, one or more display devices 184 may vary in size, resolution, technology, and functionality. Display device 188 may be able to show any data and/or visual elements described herein in various formats such as, textural, graphical, video among others, in either monochrome or color.

With continued reference to FIG. 1, a "graphical user interface (GUI)," as used herein, is a graphical form of user interface 184 that allows entity to interact with apparatus 100. In some embodiments, GUI may include icons, menus, other visual indicators, or representations (graphics), audio indicators such as primary notation, and display information and related user controls. In one or more embodiments, GUI may serve as a primary medium through which one or more pin placement quotes 144 are presented to entity. In some cases, displaying pin placement quotes 144 may include a change in GUI, such as, without limitation, presentation of a new model, display of a set of graphical markers on the model, adjustment of content display, initiation of a feedback loop, and/or the like. For instance, and without limitation, when pin placement schema 124 is generated or list of quote parameters 156 is determined, GUI may dynamically change current display in real-time e.g., 3D CAD model to display pin placement schema 124 or pin placement quote 144. In some cases, display may be overlayed as described above. In other cases, pin placement quote 144 formulated based on list of quote parameters 156 may be displayed next to pin placement schema 124. Additionally, or alternatively, GUI may be designed to capture user input 180 as described above from entity. In a non-limiting example, part data 112 may be received from user devices through one or more interactions (i.e., user input 180) between entity and user interface 184.

Figure 2:
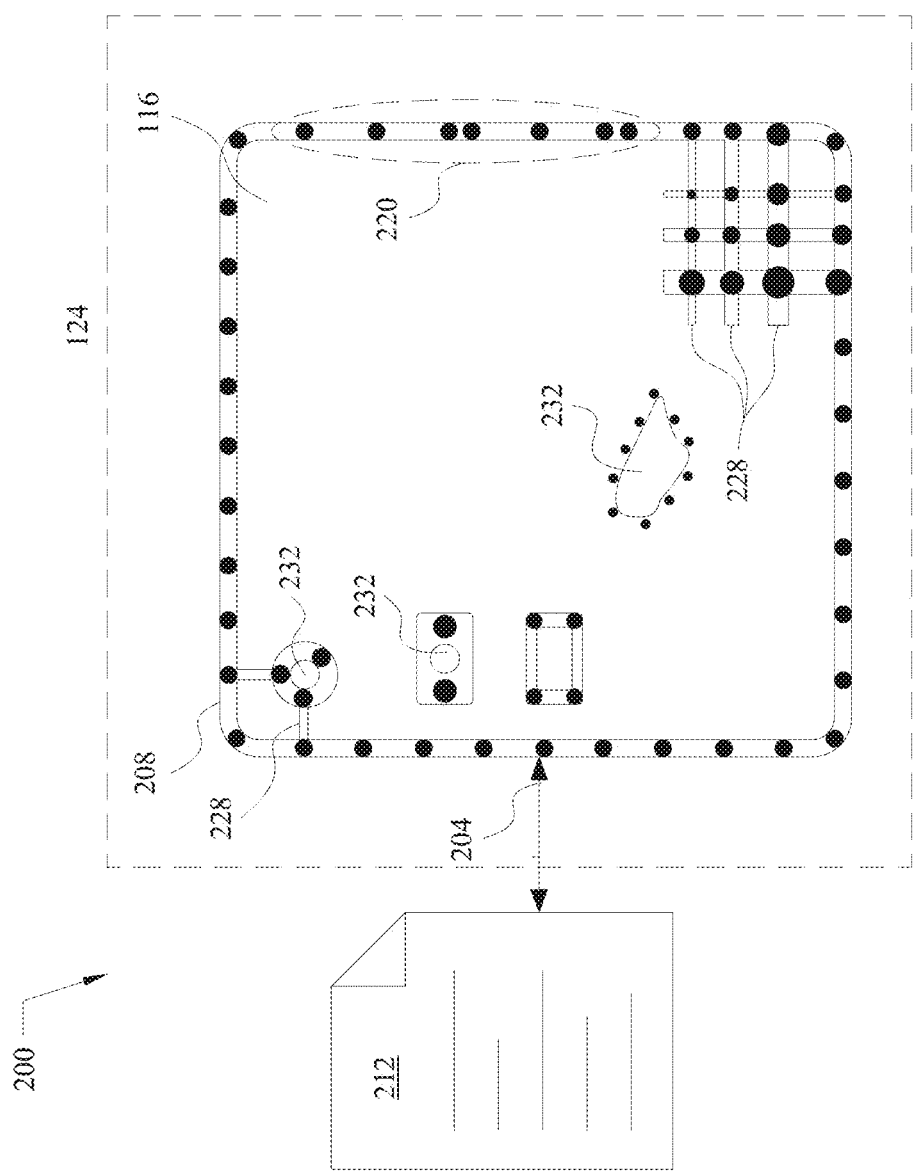
FIG. 2 shows an exemplary embodiment of a pin placement quote.

Now referring to FIG. 2, an exemplary embodiment of a pin placement quote 200 is illustrated. In an embodiment, pin placement quote 200 may include an association 204 between projected part data 112 and list of quote parameters 212. Association 204 may include any association as described above with reference to FIG. 1 implemented by linear mappings, machine learning models, data correlations, and/or the like. In some cases, projected part data 112 may include a pin placement schema 124, wherein the pin placement schema 124 may include a 2D print e.g., top view of 3D CAD model of a part with plurality of pin placement configuration 132 e.g., pin locations and size indicated by plurality of graphical markers 220 overlay on top of the print. In some cases, part may include a plurality of features such as, without limitation, rib 208, boss 228, hole 232, and/or the like. In a non-limiting example, graphical markers 220 may be colored, aiding in quick visual identification at display device 188 (not shown). In some cases, the area of the mark may indicate a desired pin diameter e.g., a larger area may represent a pin with a larger diameter, while a smaller area may signify a pin with a smaller diameter. Additionally, or alternatively, pin placement schema 124 may incorporate different shapes or patterns for the marks as described above. For example, a circular mark may represent a steel pin, while a triangular marker may represent a titanium nitride (TiN) coated pin. In some cases, each quote parameter of the list of quote parameters 212 may be mapped to graphical marker or a portion of projected part data 112 configured to illustrate the origin or basis of each quote parameter.

Figure 3:
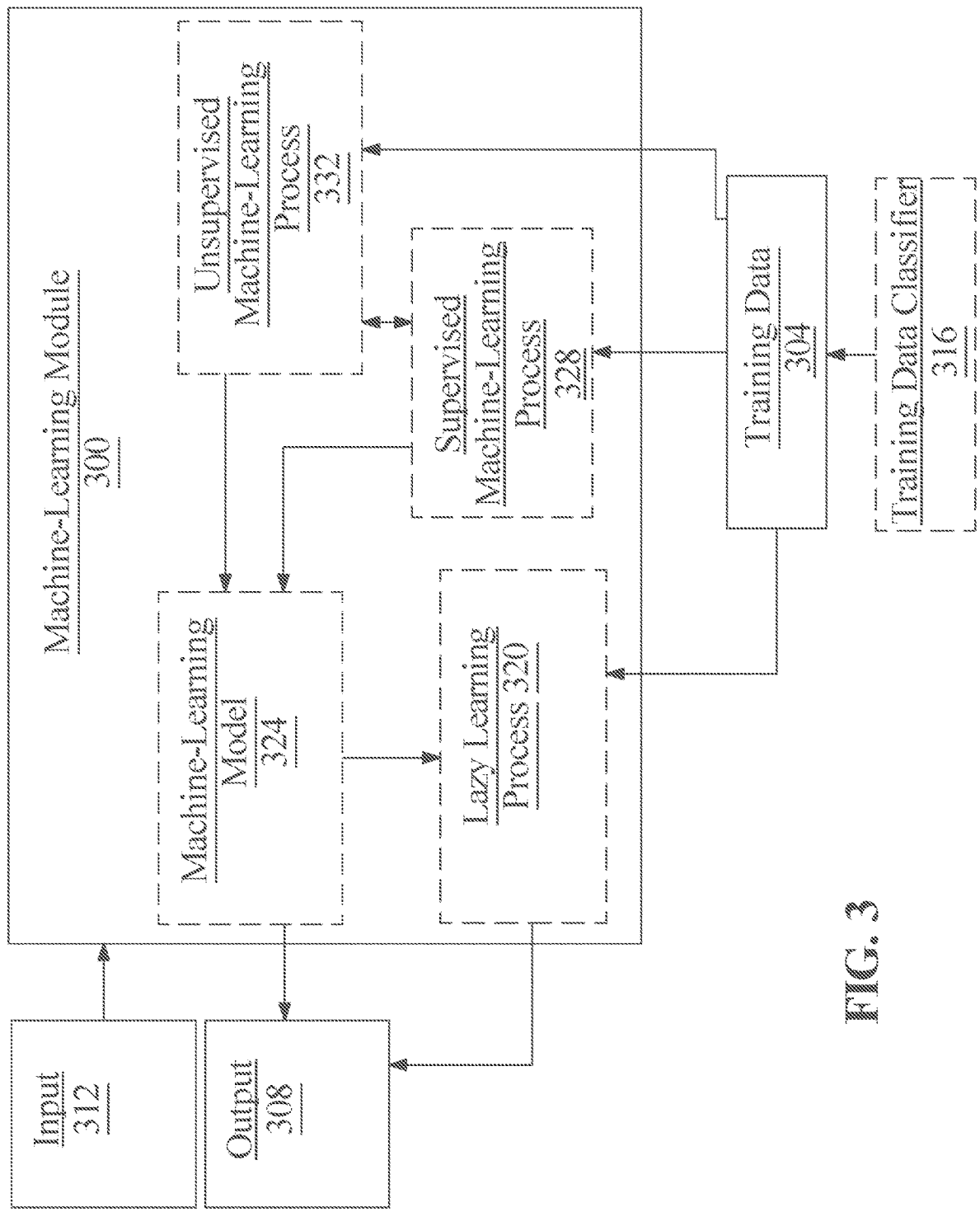
FIG. 3 is a block diagram of an exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example training data may include a plurality of part data as input correlated to a plurality of part features as output.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 3, computing device 304 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 304 may then calculate a likelihood table by calculating probabilities of different data entries and classification labels. Computing device 304 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device 304 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, santization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the 25th percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 320. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 320 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 320 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include plurality of part data e.g., 3D CAD models as described above as inputs, plurality of part features as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 320 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/ or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
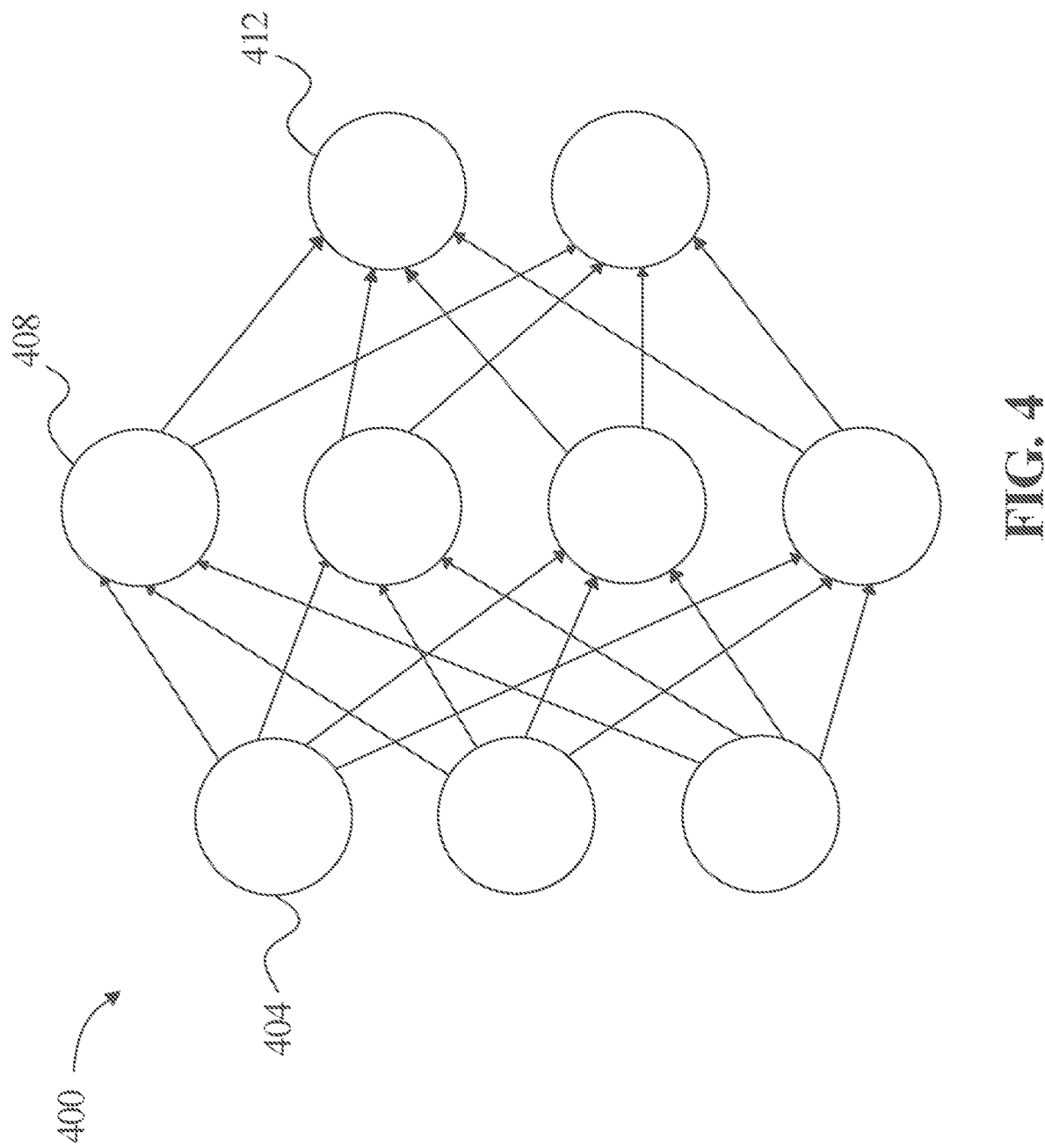
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. In a non-limiting embodiment, input layer of nodes 404 may include any remote display where user inputs may be provided from, while output layer of nodes 412 may include either the local device if it has the processing capability to support the requisite machine-learning processes, or output layer of nodes 412 may refer to a centralized, network connected processor able to remotely conduct the machine-learning processes described herein. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

With continued reference to FIG. 4, in an embodiment, neural network may include a deep neural network (DNN). As used in this disclosure, a "deep neural network" is defined as a neural network with two or more hidden layers. In a non-limiting example, neural network may include a convolutional neural network (CNN). A "convolutional neural network," for the purpose of this disclosure, is a neural network in which at least one hidden layer is a convolutional layer that convolves inputs to that layer with a subset of inputs known as a "kernel," along with one or more additional layers such as pooling layers, fully connected layers, and the like. In some cases, CNN may include, without limitation, a deep neural network (DNN) extension. Mathematical (or convolution) operations performed in the convolutional layer may include convolution of two or more functions, where the kernel may be applied to input data e.g., a plurality of 3D CAD models or part images through a sliding window approach. In some cases, convolution operations may enable processor to detect local/global patterns, edges, textures, and any other features described herein within input data as described above. Features within input data may be passed through one or more activation functions, such as without limitation, Rectified Linear Unit (ReLU), to introduce non-linearities into one or more generating processing steps as described above with reference to FIG. 1. Additionally, or alternatively, CNN may also include one or more pooling layers, wherein each pooling layer is configured to reduce the dimensionality of input data while preserving essential features within the input data. In a non-limiting example, CNN may include one or more pooling layer configured to reduce the dimensions of feature maps by applying downsampling, such as max-pooling or average pooling, to small, non-overlapping regions of one or more features.

Still referring to FIG. 4, CNN may further include one or more fully connected layers configured to combine features extracted by the convolutional and pooling layers as described above. In some cases, one or more fully connected layers may allow for higher-level pattern recognition. In a non-limiting example, one or more fully connected layers may connect every neuron (i.e., node) in its input to every neuron in its output, functioning as a traditional feedforward neural network layer. In some cases, one or more fully connected layers may be used at the end of CNN to perform high-level reasoning and produce the final output such as, without limitation, plurality of part features and/or pin locations. Further, each fully connected layer may be followed by one or more dropout layers configured to prevent overfitting, and one or more normalization layers to stabilize the learning process described herein.

With continued reference to FIG. 4, in an embodiment, training the neural network (i.e., CNN) may include selecting a suitable loss function to guide the training process. In a non-limiting example, a loss function that measures the difference between the predicted output and the ground truth may be used, such as, without limitation, mean squared error (MSE) or a custom loss function may be designed for one or more embodiments described herein. Additionally, or alternatively, optimization algorithms, such as stochastic gradient descent (SGD), may then be used to adjust CNN's parameters to minimize such loss. In a further non-limiting embodiment, instead of directly predicting classification or category of input data, CNN may be trained as a regression model to predict numerical output such as numerical quote parameters e.g., cost estimations as described above with reference to FIG. 1. Additionally, CNN may be extended with additional deep learning techniques, such as recurrent neural networks (RNNs) or attention mechanism, to capture additional features and/or data relationships within input data.

Figure 5:
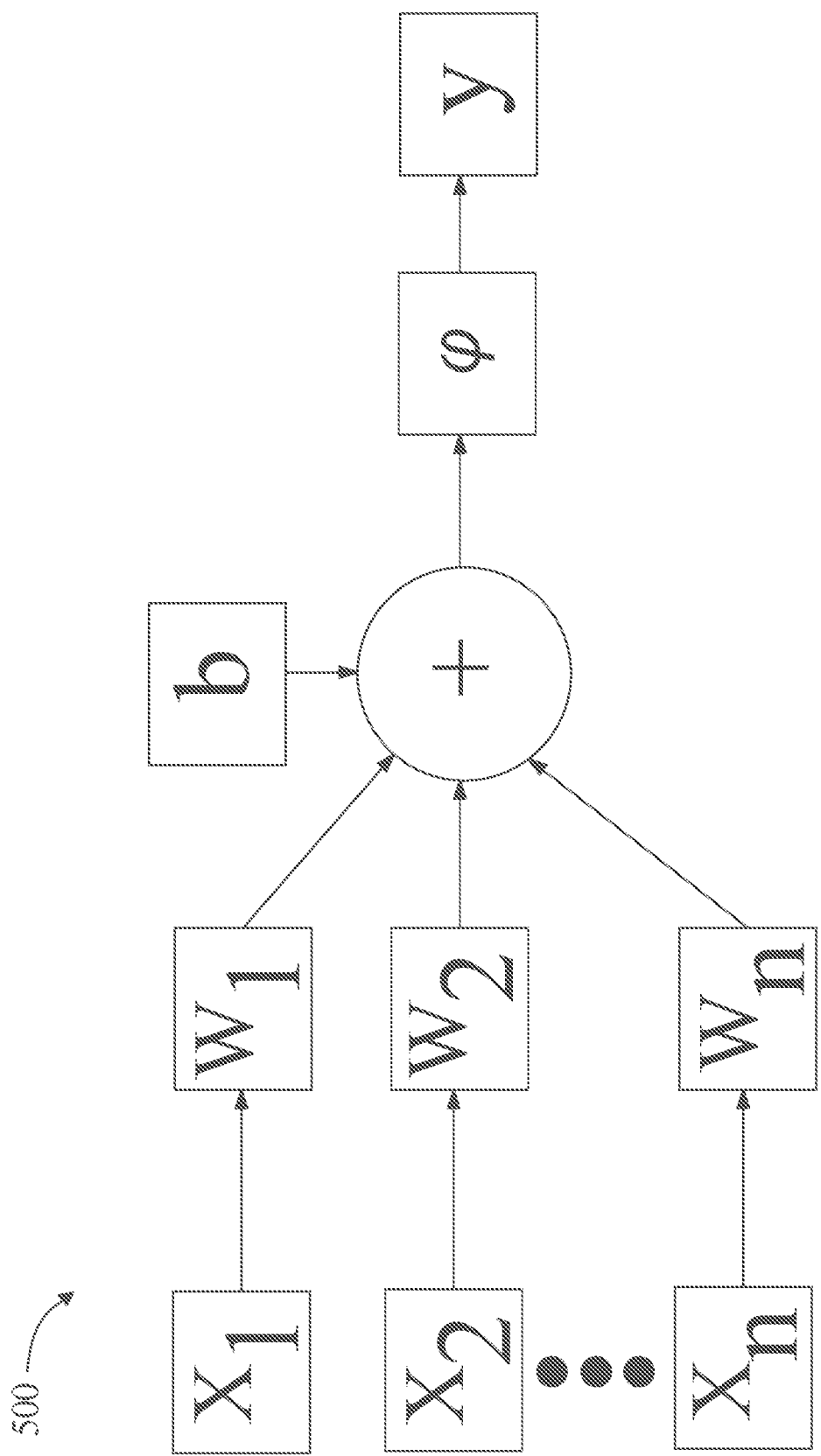
FIG. 5 is a block diagram of an exemplary embodiment of a node of a neural network.

Referring now to FIG. 5, an exemplary embodiment of a node 500 of a neural network is illustrated. A node may include, without limitation, a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/T}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function $\sigma$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
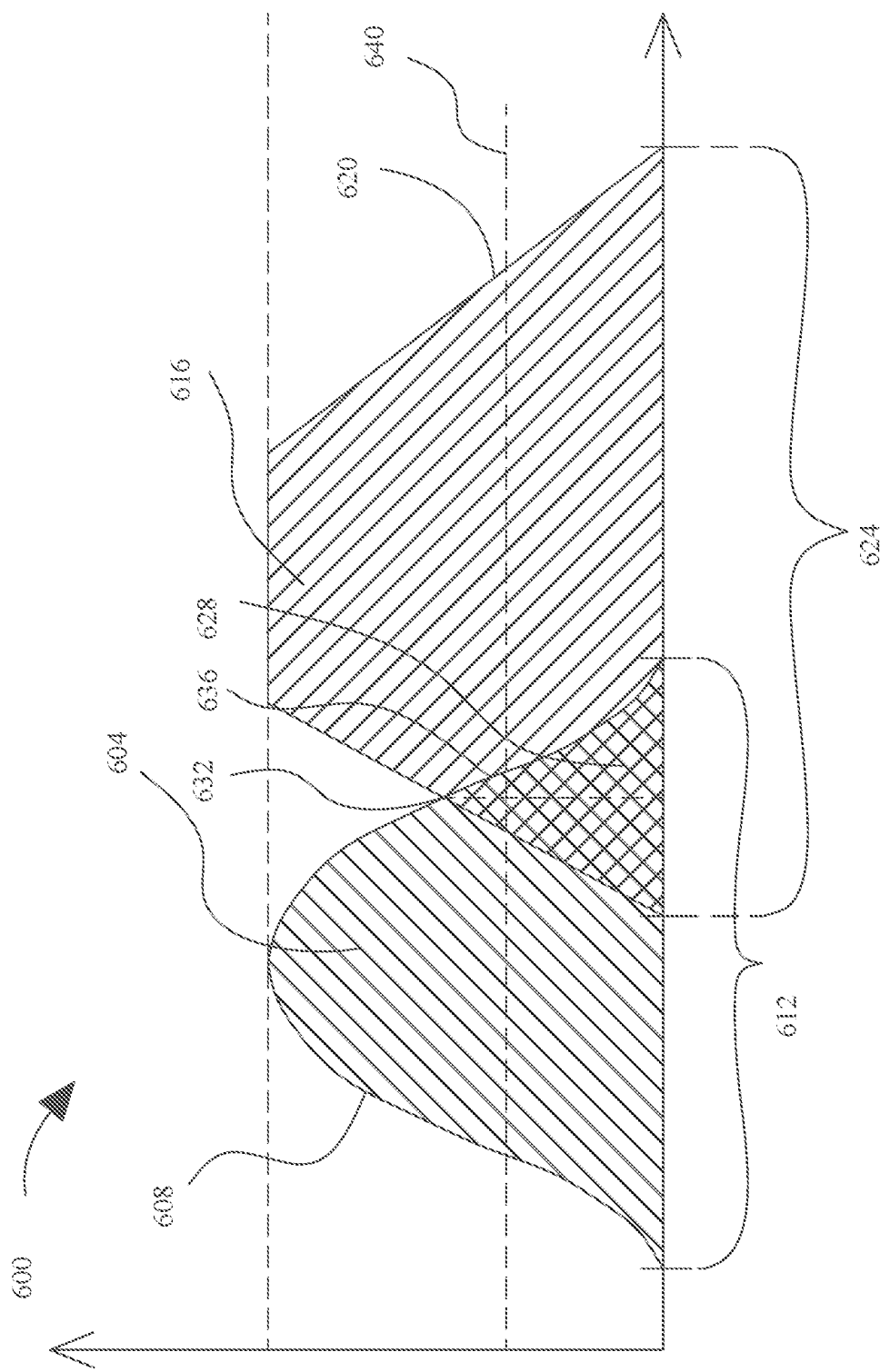
FIG. 6 is a graph illustrating an exemplary relationship between fuzzy sets.

Referring to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models, pin placement configurations, and/or the like, and a predetermined class, such as without limitation, plurality of part features. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively, or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or pin placement configurations and a predetermined class, such as without limitation plurality of part features, for combination to occur as described above. Alternatively, or additionally, each threshold may be tuned by a machine-learning and/or statistical process, for instance and without limitation as described in further detail below.

Further referring to FIG. 6, in an embodiment, a degree of match between fuzzy sets may be used to classify a pin placement configuration with plurality of part features. For instance, if plurality of part features has a fuzzy set matching pin placement configurations fuzzy set by having a degree of overlap exceeding a threshold, processor 104 may classify the pin placement configurations as belonging to the plurality of part features. Where multiple fuzzy matches are performed, degrees of match for each respective fuzzy set may be computed and aggregated through, for instance, addition, averaging, or the like, to determine an overall degree of match.

Still referring to FIG. 6, in an embodiment, a pin placement configuration may be compared to multiple part features fuzzy sets. For instance, pin placement configurations may be represented by a fuzzy set that is compared to each of the multiple part features fuzzy sets; and a degree of overlap exceeding a threshold between the pin placement configurations fuzzy set and any of the multiple part features fuzzy sets may cause processor 104 to classify the pin placement configurations as belonging to plurality of part features categorization. For instance, in one embodiment there may be two part features fuzzy sets, representing respectively a first plurality of part features and a second plurality of part features. First plurality of part features may have a first fuzzy set; Second plurality of part features may have a second fuzzy set; and pin placement configurations may have a pin placement configurations fuzzy set. processor 104, for example, may compare a pin placement configurations fuzzy set with each part features fuzzy set, as described above, and classify a pin placement configuration to either, both, or neither of first plurality of part features or/and/nor second plurality of part features. Machine-learning methods as described throughout may, in a non-limiting example, generate coefficients used in fuzzy set equations as described above, such as without limitation x, c, and σ of a Gaussian set as described above, as outputs of machine-learning methods. Likewise, pin placement configurations may be used indirectly to determine a fuzzy set, as pin placement configurations fuzzy set may be derived from outputs of one or more machine-learning models that take the pin placement configurations directly or indirectly as inputs.

Still referring to FIG. 6, in some embodiments, determining the pin placement configurations based on plurality of part features may include using a fuzzy inference engine. A fuzzy inference engine may be configured to map one or more part feature data elements using fuzzy logic. In some embodiments, part features may be arranged by a logic comparison program into pin placement configurations arrangement. A "pin placement configuration arrange arrangement" as used in this disclosure is any grouping of objects and/or data related to pin placement configurations based on a pre-determined criteria. This step may be implemented as described above in FIGS. 3-4. Membership function coefficients and/or constants as described above may be tuned according to classification and/or clustering algorithms. For instance, and without limitation, a clustering algorithm may determine a Gaussian or other distribution of questions about a centroid corresponding to a given threshold level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, an inference engine may be implemented according to input and/or output membership functions and/or geometric parameters such as pin placement configurations. For instance, a first membership function may represent a first measurable value pertaining to pin placement configurations, such as a degree of proximity of an element, while a second membership function may indicate a degree of alignment of a subject thereof, or another measurable value pertaining to pin placement configurations. Continuing the example, an output pin placement configuration may represent, without limitation, a desired pin diameter value. An inference engine may combine rules, such as: "if proximity is 'high' and alignment is optimal, the pin diameter is suitable"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T (a, b), c)), and the requirement that the number 1 acts as an identity element. Combinations of rules ("and" or "or" combination of rule membership determinations) may be performed using any T-conorm, as represented by an inverted T symbol or "⊥," such as max (a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a,⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Figure 7:
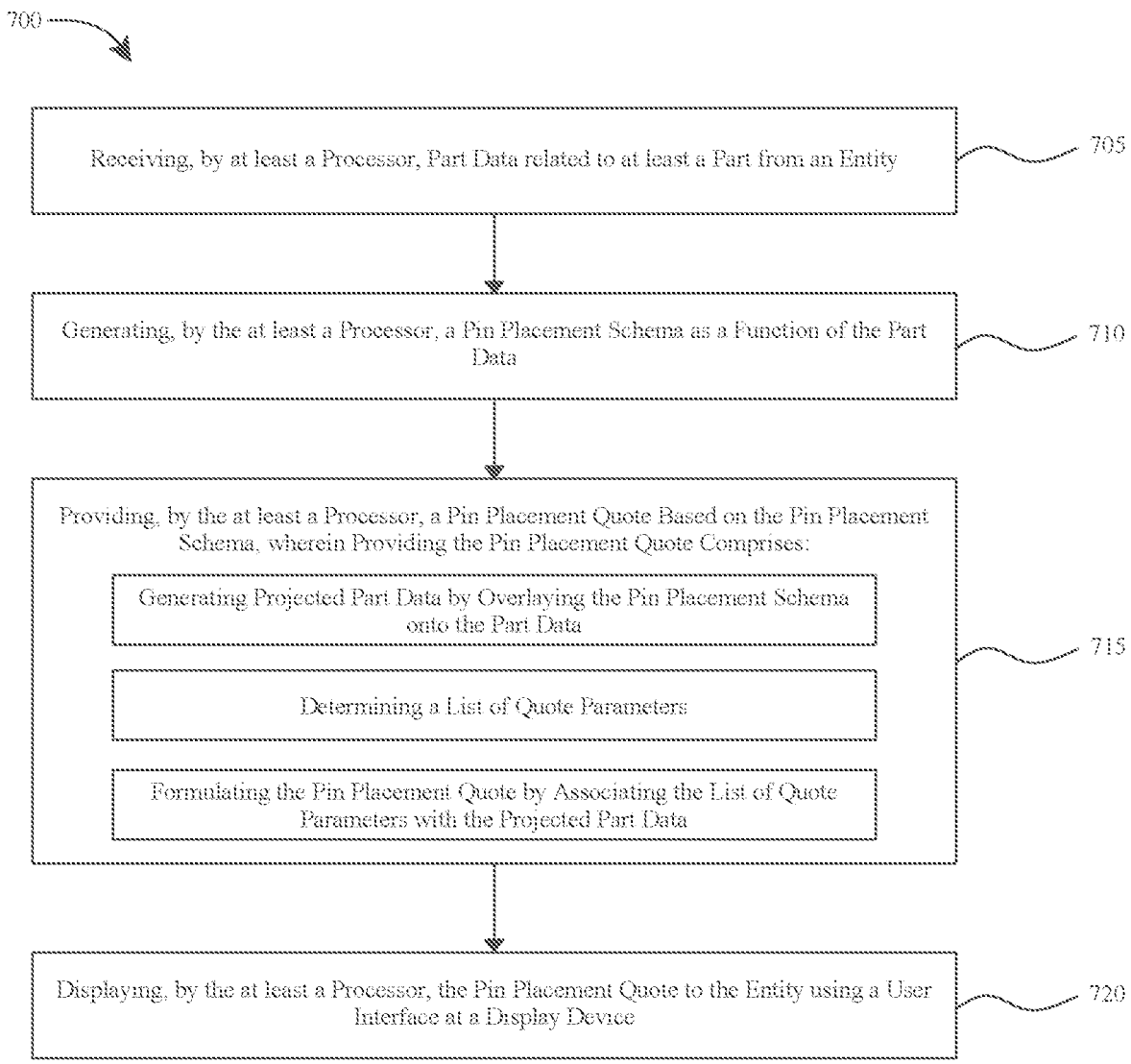
FIG. 7 is a flow diagram of an exemplary embodiment of a method for automatic pin placement in injection molding.

Now referring to FIG. 7, a flow diagram of an exemplary method 700 for instantaneous generation of a pin placement quote in an injection molding process is illustrated. The method 700 includes a step 705 of receiving, by at least a processor, part data related to at least a part from an entity. In some cases, the part data may include at least one computer-aided design (CAD) model of the at least a part. This may be implemented, without limitation, as described above with reference to FIGS. 1-6.

With continued reference to FIG. 7, method 700 includes step 710 of generating, by the at least a processor, a pin placement schema as a function of the part data. In some embodiments, generating the pin placement schema may include identifying a plurality of part features as a function of the part data, and generating a pin placement schema by matching each part feature with at least one pre-defined pin placement configuration, wherein the at least one pre-defined pin placement configuration may include at least one pin location and one or more selections of pin corresponding to the at least one pin location. This may be implemented, without limitations, as described above with reference to FIGS. 1-6.

With continued reference to FIG. 7, method 700 includes a step of 715 of providing, by the at least a processor, a pin placement quote based on the pin placement schema, wherein providing the pin placement quote includes generating a projected part data by overlaying the pin placement schema onto the part data, determining a list of quote parameters, and formulating the pin placement quote by associating the list of quote parameters with the projected part data. In some embodiments, overlaying the pin placement schema may include registering a plurality of graphical markers on the part data, wherein each graphical marker of the plurality of graphical markers denotes a visual representation of the at least one pre-defined pin placement configuration. In some embodiments, the list of quote parameters may include at least one quantitative value associated with an initiation of the injection molding process of the at least a part and a temporal element describing a span from the initiation of the injection molding process to a final receipt of the at least a part. In some embodiments, determining a list of quote parameters may include determining a complexity score associated with the at least a part as a function of the projected part data and determining the list of quote parameters as a function of the complexity score. In some embodiments, determining the list of quote parameters may include training a quote parameter estimation model using quote parameter training data, wherein the quote parameter training data comprises a plurality of projected part data as input correlates to a plurality of quote parameter lists as output, and determining the list of quote parameters as a function of the projected part data using the trained quote parameter estimation model. In other embodiments, formulating the pin placement quote may include generating a pin placement recommendation as a function of the list of quote parameters. This may be implemented, without limitations, as described above with reference to FIGS. 1-6.

With continued reference to FIG. 7, method 700 includes step 720 of displaying, by the at least a processor, the pin placement quote to the entity using a user interface at a display device. In some embodiments, method 700 may further include recalibrating the projected part data upon an implementation of the pin placement recommendation based on a user input. In some embodiments, recalibrating the projected part data may include updating the list of quote parameters as a function of recalibrated projected part data. This may be implemented, without limitations, as described above with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
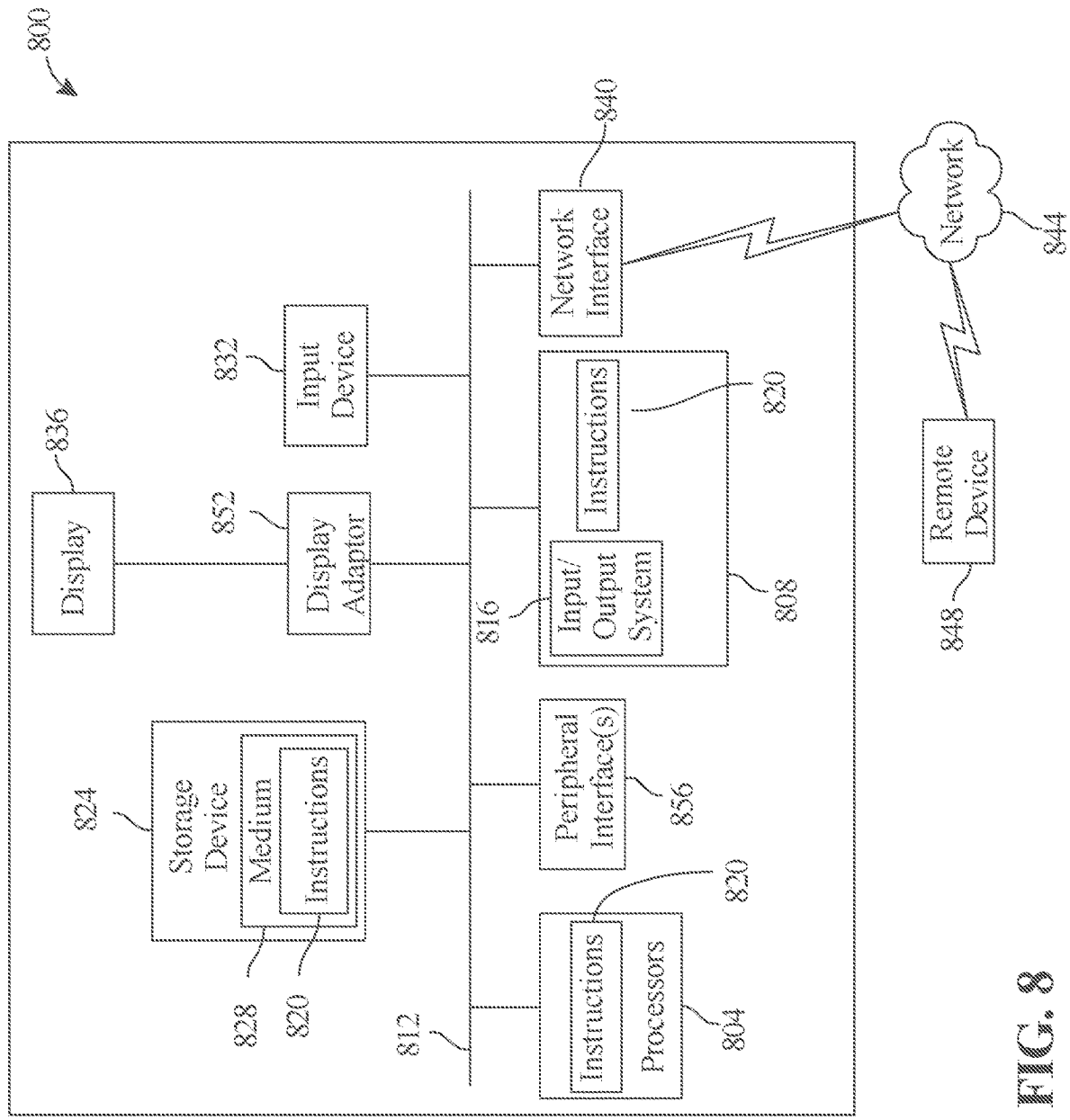
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for instantaneous generation of a pin placement quote in an injection molding process, wherein the apparatus comprises:
    at least a processor; and
    a memory communicatively connected to the at least a processor, wherein the memory contains instructions configuring the at least a processor to:
        receive part data related to at least a part from an entity;
        generate a pin placement schema as a function of the part data;
        provide a pin placement quote based on the pin placement schema, wherein providing the pin placement quote comprises:
            generating a projected part data by overlaying the pin placement schema onto the part data;
            determining a list of quote parameters, wherein determining the list of quote parameters comprises determining a complexity score associated with the at least a part as a function of the part data, and wherein the list of quote parameters is determined as a function of the complexity score;
            adjusting the pin placement quote based on the complexity score; and
            formulating the pin placement quote by associating the list of quote parameters with the projected part data; and
        display the pin placement quote to the entity using a user interface at a display device.

2. The apparatus of claim 1, wherein the part data comprises at least one computer-aided design (CAD) model of the at least a part.

3. The apparatus of claim 1, wherein generating the pin placement schema comprises:
    identifying a plurality of part features as a function of the part data; and
    generating a pin placement schema by matching each part feature with at least one pre-defined pin placement configuration, wherein the at least one pre-defined pin placement configuration comprises:
        at least one pin location; and
        one or more selections of pin corresponding to the at least one pin location.

4. The apparatus of claim 3, wherein overlaying the pin placement schema comprises:
    registering a plurality of graphical markers on the part data, wherein each graphical marker of the plurality of graphical markers denotes a visual representation of the at least one pre-defined pin placement configuration.

5. The apparatus of claim 1, wherein the list of quote parameters comprises:
    at least one quantitative value associated with an initiation of the injection molding process of the at least a part; and
    a temporal element describing a span from the initiation of the injection molding process to a final receipt of the at least a part.

6. The apparatus of claim 1, wherein determining the list of quote parameters comprises:
    training a quote parameter estimation model using quote parameter training data, wherein the quote parameter training data comprises a plurality of projected part data as input correlates to a plurality of quote parameter lists as output; and
    determining the list of quote parameters as a function of the projected part data using the trained quote parameter estimation model.

7. The apparatus of claim 1, wherein formulating the pin placement quote comprises generating a pin placement recommendation as a function of the list of quote parameters.

8. The apparatus of claim 7, wherein the memory further contains instructions configuring the at least a processor to:
   recalibrate the projected part data upon an implementation of the pin placement recommendation based on a user input.

9. The apparatus of claim 8, wherein recalibrating the projected part data comprises updating the list of quote parameters as a function of recalibrated projected part data.

10. A method for instantaneous generation of a pin placement quote in an injection molding process, wherein the method comprises:
   receiving, by at least a processor, part data related to at least a part from an entity;
   generating, by the at least a processor, a pin placement schema as a function of the part data;
   providing, by the at least a processor, a pin placement quote based on the pin placement schema, wherein providing the pin placement quote comprises:
      generating a projected part data by overlaying the pin placement schema onto the part data;
      determining a list of quote parameters, wherein determining the list of quote parameters comprises determining a complexity score associated with the at least a part as a function of the part data, and wherein the list of quote parameters is determined as a function of the complexity score;
      adjusting the pin placement quote based on the complexity score; and
      formulating the pin placement quote by associating the list of quote parameters with the projected part data; and
   displaying, by the at least a processor, the pin placement quote to the entity using a user interface at a display device.

11. The method of claim 10, wherein the part data comprises at least one computer-aided design (CAD) model of the at least a part.

12. The method of claim 10, wherein generating the pin placement schema comprises:
   identifying a plurality of part features as a function of the part data; and
   generating a pin placement schema by matching each part feature with at least one pre-defined pin placement configuration, wherein the at least one pre-defined pin placement configuration comprises:
      at least one pin location; and
      one or more selections of pin corresponding to the at least one pin location.

13. The method of claim 12, wherein overlaying the pin placement schema comprises:
   registering a plurality of graphical markers on the part data, wherein each graphical marker of the plurality of graphical markers denotes a visual representation of the at least one pre-defined pin placement configuration.

14. The method of claim 10, wherein the list of quote parameters comprises:
   at least one quantitative value associated with an initiation of the injection molding process of the at least a part; and
   a temporal element describing a span from the initiation of the injection molding process to a final receipt of the at least a part.

15. The method of claim 10, wherein determining the list of quote parameters comprises:
   training a quote parameter estimation model using quote parameter training data, wherein the quote parameter training data comprises a plurality of projected part data as input correlates to a plurality of quote parameter lists as output; and
   determining the list of quote parameters as a function of the projected part data using the trained quote parameter estimation model.

16. The method of claim 10, wherein formulating the pin placement quote comprises generating a pin placement recommendation as a function of the list of quote parameters.

17. The method of claim 16, further comprises:
   recalibrating the projected part data upon an implementation of the pin placement recommendation based on a user input.

18. The method of claim 17, wherein recalibrating the projected part data comprises updating the list of quote parameters as a function of recalibrated projected part data.

* * * * *